(12) United States Patent
Lin

(10) Patent No.: US 8,275,193 B2
(45) Date of Patent: *Sep. 25, 2012

(54) MINIATURIZED GPS/MEMS IMU INTEGRATED BOARD

(75) Inventor: Ching-Fang Lin, Simi Valley, CA (US)

(73) Assignee: America GNC Corporation, Simi Valley, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 12/008,205

(22) Filed: Jan. 8, 2008

(65) Prior Publication Data

US 2010/0283832 A1 Nov. 11, 2010

Related U.S. Application Data

(63) Continuation-in-part of application No. 10/912,401, filed on Aug. 4, 2004, now Pat. No. 7,376,262.

(60) Provisional application No. 60/880,345, filed on Jan. 12, 2007.

(51) Int. Cl.
*G06K 9/00* (2006.01)
*G06K 9/62* (2006.01)
*G06K 9/66* (2006.01)
*G01C 21/00* (2006.01)

(52) U.S. Cl. ........ 382/154; 382/103; 382/190; 382/156; 701/468

(58) Field of Classification Search .................. 382/103, 382/106, 154, 156, 168, 171, 173, 181, 262; 356/12; 701/468

See application file for complete search history.

(56) References Cited

U.S. PATENT DOCUMENTS

| | | | | |
|---|---|---|---|---|
| 5,692,061 A | * | 11/1997 | Sasada et al. | 382/106 |
| 6,072,903 A | * | 6/2000 | Maki et al. | 382/190 |
| 6,721,444 B1 | * | 4/2004 | Gu et al. | 382/154 |
| 6,950,550 B1 | * | 9/2005 | Sumi et al. | 382/154 |
| 2004/0101161 A1 | * | 5/2004 | Roh et al. | 382/103 |
| 2005/0031167 A1 | * | 2/2005 | Hu et al. | 382/103 |

* cited by examiner

*Primary Examiner* — Claire X Wang
*Assistant Examiner* — Andrae S Allison
(74) *Attorney, Agent, or Firm* — Raymond Y. Chan; David and Raymond Patent Firm

(57) ABSTRACT

This invention documents the efforts on the research and development of a miniaturized GPS/MEMS IMU integrated navigation system. A miniaturized GPS/MEMS IMU integrated navigation system is presented; Laser Dynamic Range Imager (LDRI) based alignment algorithm for space applications is discussed. Two navigation cameras are also included to measure the range and range rate which can be integrated into the GPS/MEMS IMU system to enhance the navigation solution.

17 Claims, 30 Drawing Sheets

Attitude Error Equation

$$\dot{\psi}_c^{[AERCam]} = \psi_c^{[AERCam]} \times \hat{\omega}_{AERCam/n}^{[AERCam]} + \varepsilon_g^{[AERCam]}, \psi_c^{[AERCam]}(0) = 0$$

Velocity Error Equation

$$\frac{d}{dt}\Delta u^{[n]} = C_{n/AERCam}\psi_c^{[AERCam]} \times \hat{a}_{AERCam}^{[AERCam]} + C_{n/AERCam}\varepsilon_a^{[AERCam]}$$

Accelerometer Error Model

$$\hat{a}_{AERCam}^{[AERCam]} = a_{AERCam}^{[AERCam]} + \varepsilon_a^{[AERCam]}$$

$$\varepsilon_a = b_a + H_a a + A_{a2}(f_l - f_x) + w_{\varepsilon a}$$

Gyro Error Model

$$\hat{\omega}_{AERCam/n}^{[AERCam]} = \omega_{AERCam/n}^{[AERCam]} + \varepsilon_g^{[AERCam]}$$

$$\varepsilon_g = \frac{1}{T}(T\omega + Tb_g + TH_g\omega + w_{arw} + w_{\varepsilon g})$$

FIG.28 (Table 1)

| Number | Symbol | Definition | Internal Units |
|---|---|---|---|
| 1 - 3 | $\Delta u$ | Master/slave velocity errors | m/sec |
| 4 - 6 | $\psi_c$ | Master/slave attitude errors | rad |
| 7 - 9 | $b_a$ | Accelerometer bias | m/sec |
| 10 - 15 | $colH_a$ | Scale factor and alignment error | ppm |
| 16-18 | $f_l\text{-}f_x$ | Nonlinear sensitivity | $1/m/sec^2$ |
| 19-21 | $b_g$ | Gyro bias & rad/sec | rat/sec |
| 22-27 | $colH_g$ | Scale factor and nonlinearity | ppm |

FIG.29 (Table 2)

Linear State Model

$$\dot{X}(t) = F(t)X(t) + G(t)W(t), W(t) = N\{0, Q(t)\} \text{ and } X(0) = N\{X_0, P_0\}$$

Linear Measurement Model

$$Z(t) = H(t)X(t) + V(t)$$

where $X(t)$ = State vector $F(t)$ = State matrix $G(t)$ = Process noise matrix $W(t)$ = Zero mean white Gaussian noise $Q(t)$ = Covariance matrix of state noise $Z(t)$ = Measurement vector $H(t)$ = Measurement matrix $V(t)$ = Zero mean white Gaussian noise $R(t)$ = Covariance matrix of measurement noise $X(0)$ = initial state values $X_0$ = Initial state error covariance

State and Error Covariance Propagation:

$$\hat{X}(t_k / t_{k-1}) = \Phi(t_k, t_{k-1})\hat{X}(t_{k-1} / t_{k-1}), \hat{X}(0/0) = \hat{X}_0 \text{ and } P(0/0) = \hat{P}_0$$

$$P(t_k / t_{k-1}) = \Phi(t_k, t_{k-1})P(t_{k-1} / t_{k-1})\Phi(t_k, t_{k-1})^T$$
$$+ \int_{t_{k-1}}^{t_k} \Phi(t_k, \tau)G(\tau)Q(\tau)G(\tau)^T \Phi(t_k, \tau)^T d\tau$$

State and Error Covariance Updating:

$$\hat{X}(t_k / t_k) = \hat{X}(t_k / t_{k-1}) + K(t_k)[Z(t_k) - H(t_k)\hat{X}(t_k / t_{k-1})]$$

$$P(t_k / t_k) = [I - K(t_k)H(t_k)]P(t_k / t_{k-1})$$

Kalman gain matrix

$$K(t_k) = P(t_k / t_{k-1})H(t_k)^T [H(t_k)P(t_k / t_{k-1})H(t_k)^T + R(t_k)]^{-1}$$

where $\hat{X}(t_k / t_{k-1})$ = Propagated state estimate $P(t_k / t_{k-1})$ = Propagated error covariance matrix $\hat{X}(t_k / t_k)$ = State estimate $P(t_k / t_k)$ = Error covariance matrix $\Phi(t_k, t_{k-1})$ = State transition matrix

FIG.30 (Table 3)

|  | *Start* | *End* |
|---|---|---|
| Longitude | E: 10°00" | E: 48°35" |
| Latitude | N: 13°48" | S: 3°41" |
| Height | 396,000 meters | |
| Period of Time | 600 seconds | |

FIG.31 (Table 4)

MINIATURIZED GPS/MEMS IMU INTEGRATED BOARD

CROSS REFERENCE OF RELATED APPLICATION

This is a non-provisional application of a provisional application having application No. 60/880,345 and filing date of Jan. 12, 2007, and is a Continuation-In-Part application of application Ser. No. 10/912,401 filed on Aug. 4, 2004 now U.S. Pat. No. 7,376,262.

This invention was made with Government support under contract NAS9-99024 awarded by NASA. The Government has certain rights in the invention.

BACKGROUND OF THE PRESENT INVENTION

1. Field of Invention

The present invention relates generally to machine vision systems, and more particularly to object positioning, which employs electro-optic (EO) image sensors enhanced with integrated laser ranger, global positioning system/inertial measurement unit, and integrates this data to get reliable and real time object position.

2. Description of Related Arts

There are two difficult problems for machine vision systems. One is image processing speed, another is the reliability, which affect the application of electro-optic image sensors (e.g. stereo cameras) to robotics, autonomous landing and material handling.

The match filter takes long time to match different orientation and size templates to detect certain object. In the present invention, the electro-optic image sensor imaging system derives the electro-optic image sensors' attitude and orientation data from a global positioning system/inertial measurement unit integrated navigation system for the template rotation. The electro-optic image sensor image system derives the object range data from a laser ranger for the template enlarging/shrinking.

SUMMARY OF THE PRESENT INVENTION

It is a main objective of the present invention to provide electro-optic image sensor positioning using feature matching thereof, in which three dimensional object positions can be calculated and determined.

Another objective of the present invention is to provide a universal object positioning and data integrating method and system thereof, in which the electro-optic image sensor imaging system derives the electro-optic image sensors' attitude and orientation data from a global positioning system/inertial measurement unit integrated navigation system for the template rotation.

Another objective of the present invention is to provide a universal object positioning and data integrating method and system thereof, in which the electro-optic image sensor image system derives the object range data from a laser ranger for the template enlarging/shrinking.

Another objective of the present invention is to provide a universal fiducial feature detection method and system thereof, in which the autonomous object positions can be calculated and determined by matching fiducial features in both images.

Another objective of the present invention is to provide a universal corner detection method and system thereof, in which the autonomous object positions can be calculated and determined by matching corners in both images.

Another objective of the present invention is to provide an object identification method and system thereof, in which the detected three dimensional corners and fiducial features are grouped for object identification.

Another objective of the present invention is to provide an object identification method and system thereof, in which the grouped corner and fiducial features are combined with line detection and circle detection for complex object detection.

Another objective of the present invention is to provide an intelligent automated system to realize autonomous navigation with capabilities to perform highly precise relative attitude and position determination, intelligent robust failure detection and isolation, advanced collision avoidance, and on-board situational awareness for contingency operations.

Another objective of the present invention is to provide an intelligent automated system thereof, in which two navigation cameras are utilized to measure the range and range rate.

The key to electro-optic sensors image processing is to determine which point in one image corresponds to a given point in another image. There are many methods that deal with this problem, such as the correlation method, gray level matching and graph cut. These methods process all of the image pixels for both electro-optic image sensors. Some of the methods need iteration until convergence occurs. Pixel matching is time consuming and unreliable. Actually only the feature points can be used for positioning. Points, corners, lines, circles and polygons are four types of image features. Corners and fiducial features are selected for processing.

Image segmentation is an essential procedure to extract features from images. For the segmentation, the high pass filter is used to segment an image. To improve the results of segmentation, a smoothing preprocessing operation is preferable. In order to preserve edge information in a smoothing procedure, the low pass filter is used at the preprocessing stage.

Because the fiducial features can be consistently detected in the images, the same features can be found in both images correctly by processing electro-optic sensor images and matching features on both images. The disparities (i.e., range) to the fiducial features can be easily computed.

A corner is another kind of feature, which exists in most kinds of objects. Corner detection utilizes the convolution between the original image and a corner mask, so it can be implemented in real time easily. The same corners can be found in both images, correctly, by processing the electro-optic sensor images and matching corners in both images. The disparities (i.e., range) to the corners can then be easily computed.

The present invention can substantially solve the problems encountered in machine vision system integration by using state-of-the-art inertial sensor, global positioning system technology, laser ranger unit enhanced with fiducial feature matching and corner matching technologies. The present invention is to make machine vision a practical application by enhancing real time and reliability.

These and other objectives, features, and advantages of the present invention will become apparent from the following detailed description, the accompanying drawings, and the appended claims.

BRIEF DESCRIPTION OF THE DRAWINGS

FIG. 28 is a Table 1 showing the system model of the optimal LDRI alignment filter.

FIG. 29 is a Table 2 showing the definition cf the state vector.

FIG. 30 is a Table 3 showing the optimal Kalman filter.

FIG. 31 is a Table 4 showing the trajectory parameters.

DETAILED DESCRIPTION OF THE PREFERRED EMBODIMENT

Generally, IMU/GPS integration can output the position, attitude and azimuth of the vehicle itself. A laser ranger measures the distance between the object and vehicle. Electro-optic image sensors derive the 3D environment in the field of view. The traditional electro-optic sensor image processing is time consuming and unreliable.

Figure 1:
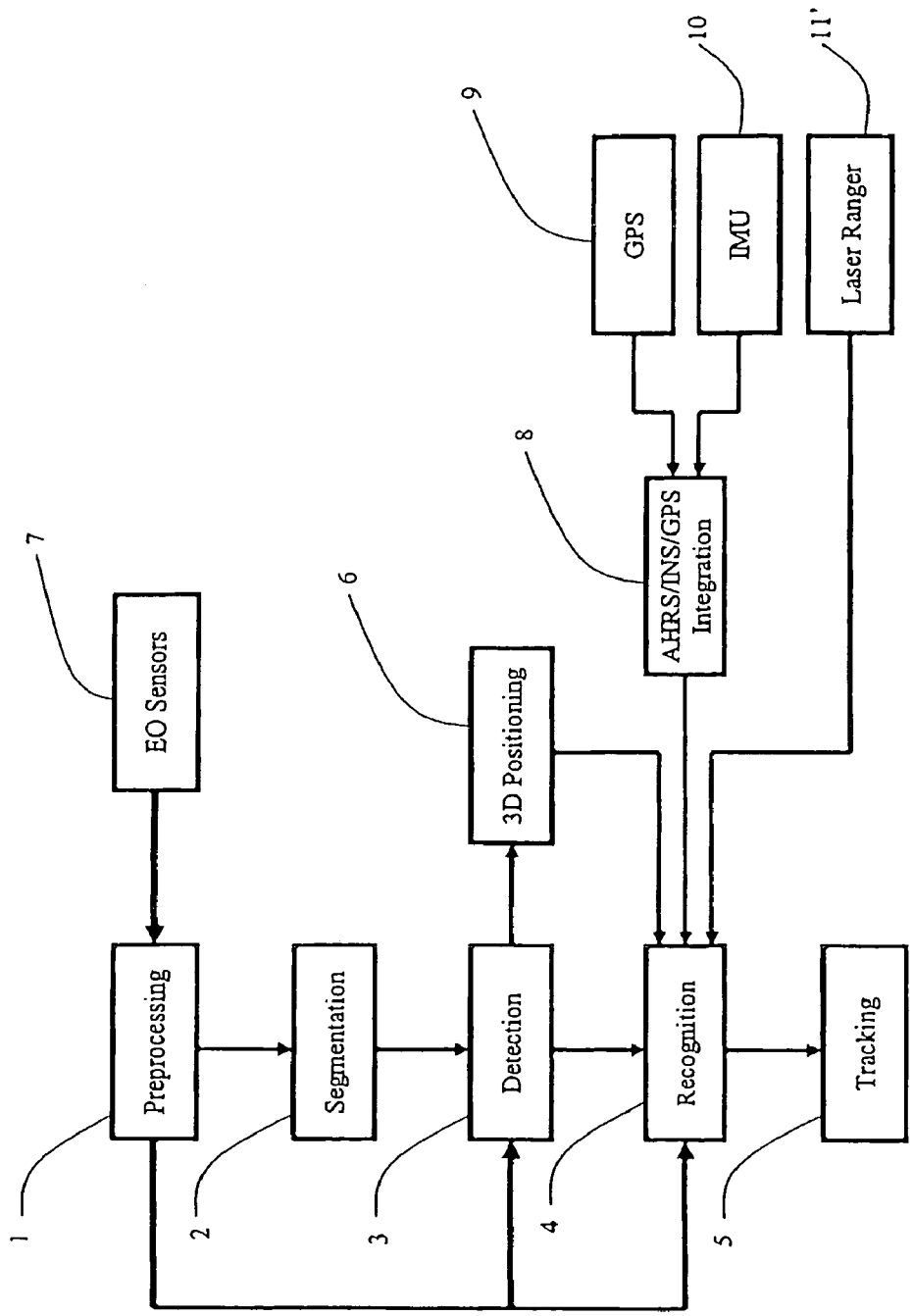
FIG. 1 is a block diagram of an image-processing module, which is composed of EO sensors, a MEMS IMU, GPS receiver, laser ranger, preprocessing module, segmentation module, detection module, recognition module, 3D positioning module and tracking module, according to a preferred embodiment of the present invention.

Referring to FIG. 1, the electro-optic sensor image processing comprises a preprocessing module 1, a segmentation module 2, a detection module 3, a recognition module 4, a 3D-positioning module 5, a tracking module 6, EO sensors 7, an AHRS/INS/GPS Integration module 8, a GPS receiver 9, a MEMS IMU 10, and a laser ranger 11.

Figure 2:
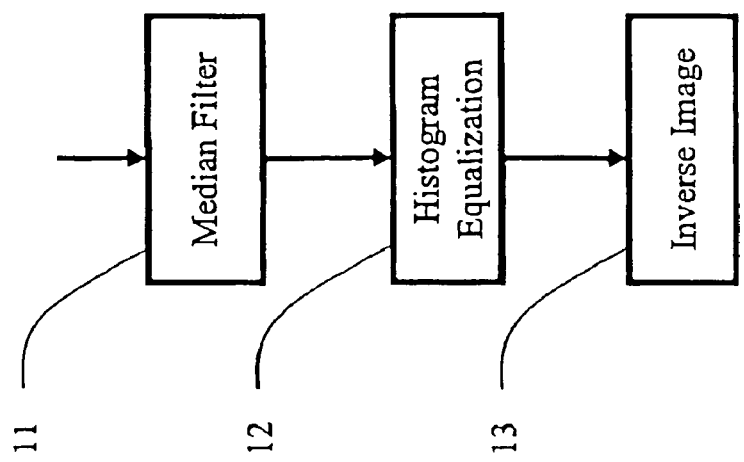
FIG. 2 is a block diagram illustrating the preprocessing module according to the above preferred embodiment of the present invention.

Referring to FIG. 2, the preprocessing module 1 comprises a Median Filter module 11, a Histogram Equalization module 12 and an Inverse Image module 13.

Figure 3:
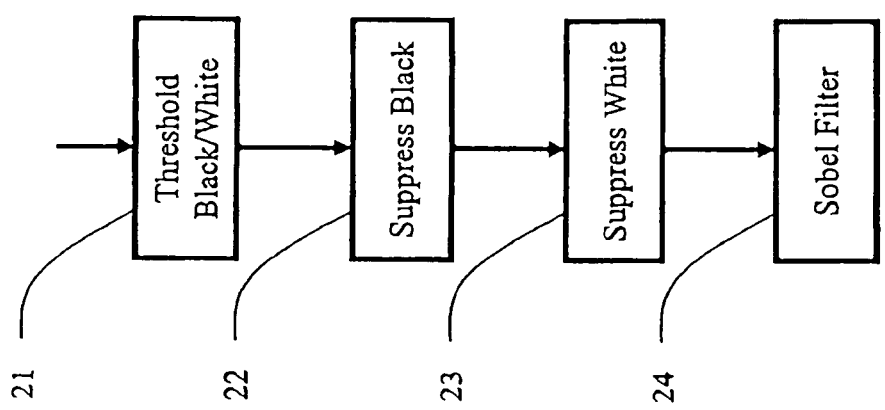
FIG. 3 is a block diagram illustrating the segmentation module according to the above preferred embodiment of the present invention.

Referring to FIG. 3, the segmentation module 2 comprises a Threshold Black/White module 21, a Suppress Black module 22, a Suppress White module 23, and a Sobel Filter module 24.

Edge detection is necessary to detect meaningful discontinuities in gray level. Line detection and circle detection also uses edge detection for segmentation. Hence, a Sobel filter is employed for edge detection. The Sobel filter masks are defined as follows,

1[−1−2−1000121][−101−202−101]

Figure 4:
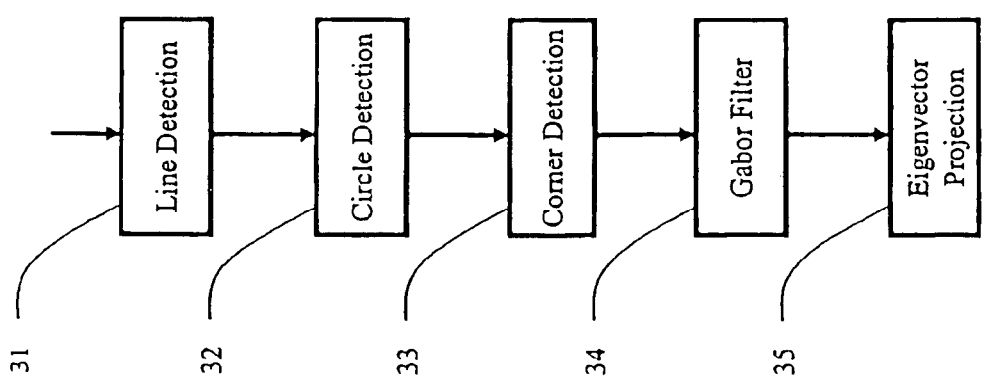
FIG. 4 is a block diagram of the detection module according to the above preferred embodiment of the present invention.

Referring to FIG. 4, the detection module 3 comprises a Line Detection module 31, a Circle Detection module 32, a Corner Detection module 33, a Gabor Filter module 34, and an Eigenvector Projection module 35.

Line detection and circle detection are defined in this paragraph. The equation of a straight line is $x \cos \theta + y \sin \theta = \rho$. Ir the $\rho..\theta$ plane the straight lines are sinusoidal curves. Binarized points (i, j) in the $\rho..\theta$ plane are used as locations of associated $(\rho_{sub.i}, \theta_{sub.j})$ pairs that satisfy the equation of the straight line. Similarly, for a circle the equation utilized is $(x-c_{sub.1})^2 + (y-c_{sub.2})^2 = c_{sub.3}^2$. The Hough transform can be generalized to apply to any equation of the form $g(v,c)=0$, where v represents the vector of coordinates and c is the vector of coefficients. The difference from the 2D parameters case is that the 2D cells and points (i,j) are replaced by the higher order cells and points (i,j,k).

The Gabor filter is used to detect the fiducial features. Matching the fiducial features in both electro-optic sensors' images results in calculation of the 3D positions of the fiducial features. The Gabor filter output is constructed as follows:

$2C(x,y)=\max; I(x,y)j(x,y,)-sj/skI(x,y)k(x,y,)r;$ where k=11, j=10, $s_{sub.j}=2^{sup.j/2}$ (scale factor), I(x,y) is the original image $\Phi_{sub.j}(x,y,\theta)=\Phi(s_{sub.jx},s_{sub.jy},\theta)$ $\Phi(x,y,\theta) = e^{-(x'^2 + y'^2)} + i\pi x'$ $x' = -x\cos\theta + y\sin\theta$ $y' = -x\sin\theta + y\cos\theta$ $\theta = 0, 90, 180$ and $270$ degrees (Orientation)

A variety of methods of corner detection can be used to detect the corners of the objects. Matching the corners in both electro-optic sensors' images results in calculation of the 3D positions of the corners.

Figure 5:
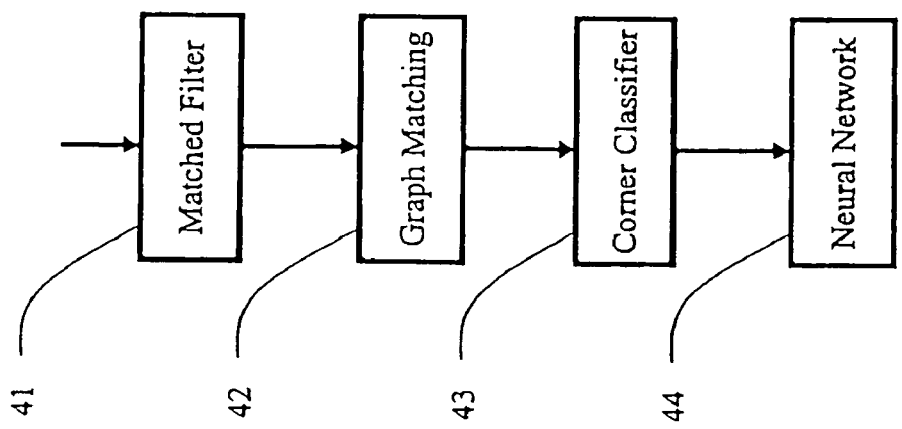
FIG. 5 is a block diagram of the recognition module according to the above preferred embodiment of the present invention.

Referring to FIG. 5, the recognition module 4 comprises a Matched Filter module 41, a Graph Matching module 42, a Corner Classifier module 43, and a Neural Network module 44.

Template correlation needs the reference object template and an image patch selected from the new image frame. Denote the two two-dimensional scenes of $N \times M$ pixels by $I(k, l)$ and $J(k, l)$ where k and l stand for the row index and column index, respectively. A direct method would compute the cross correlation function between $I(k, l)$ and $J(k, l)$ defined as 3 $R(n,m) = \frac{1}{MN} \sum_{k=1}^{N} \sum_{l=1}^{M} I(k, l) J(k+n, l+m)$ where n and m are the lag length in the row and column directions, respectively. However, the evaluation of the correlation is computationally intensive and normally not used in practice. A common way to calculate the cross correlation other than direct computation is to use the fast Fourier transformation (FFT).

In fact, a variety of methods can be used to speed up the computation of the correlation function or to reduce the amount of memory required. Division of the two-dimensional array into subarrays where only partial convolutions will be computed allows for tradeoffs between speed, memory requirements, and total lag length. In addition, since an FFT algorithm can accept complex inputs, the processing of two real series can be made in parallel. Moreover, the application of number theoretic results in the FFT transformation can take into account quantization of numbers and the finite precision of digital machines in the digital transforms. Finally, the use of specific hardware such as pipelined processing is now practical to further increase the real-time computation speed.

Figure 6:
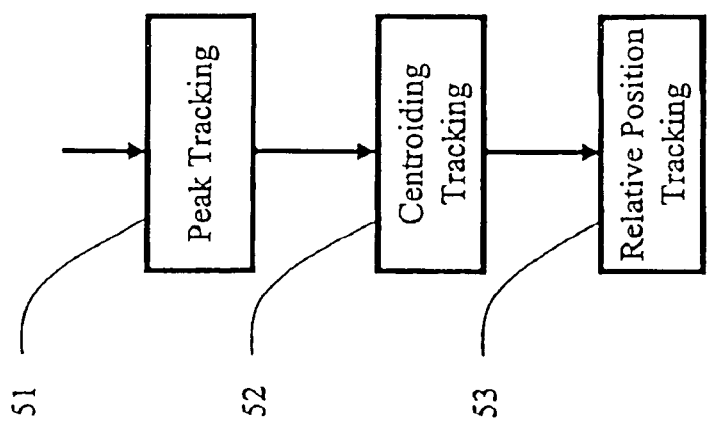
FIG. 6 is a block diagram of the tracking module according to the above preferred embodiment of the present invention.

Referring to FIG. 6, the tracking module 5 comprises a Peak Tracking module 51, a Centroiding Tracking module 52 and a Relative Position Tracking module 54.

Figure 7:
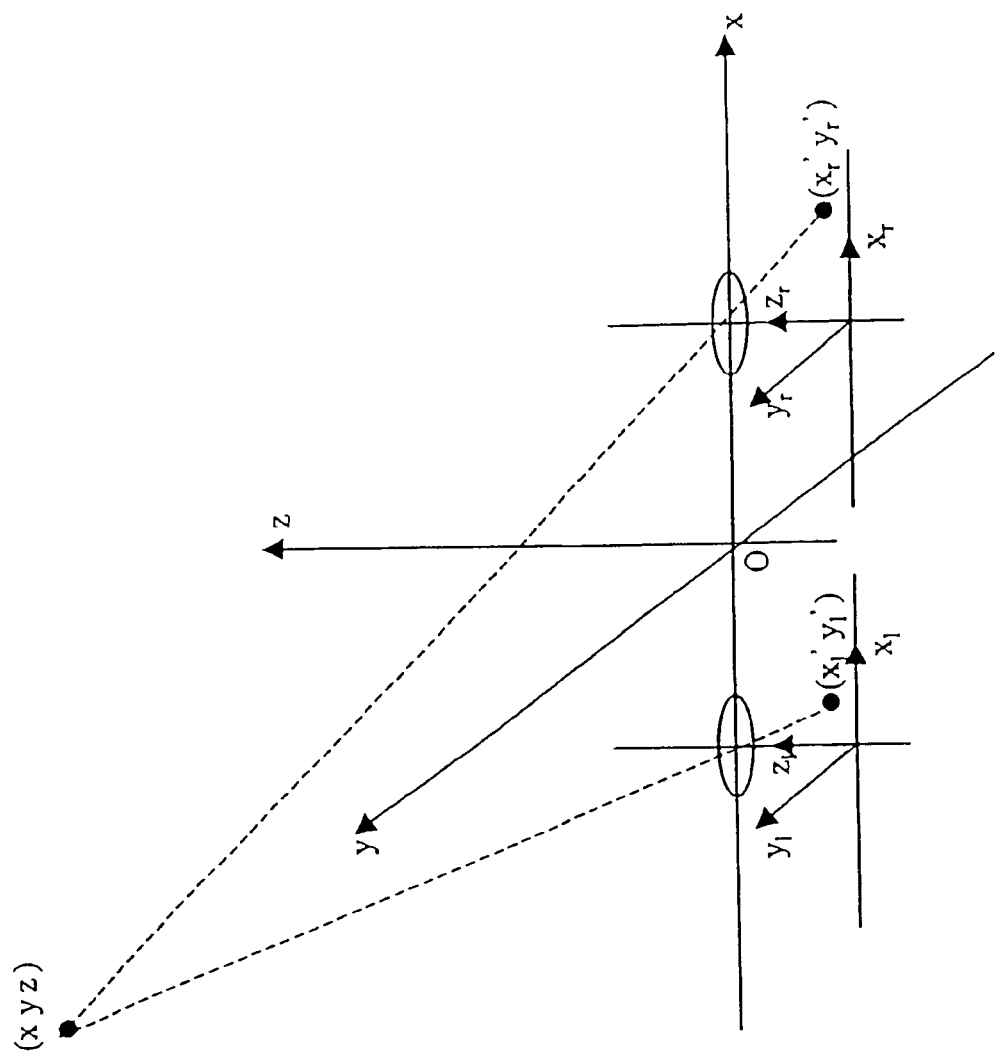
FIG. 7 is a coordinate systems definition for the 3D-positioning module according to the above preferred embodiment of the present invention.

Referring to FIG. 7, two electro-optic image sensors are fixed on the vehicle with their optical axes parallel. The baseline b is perpendicular to the optical axes. The vehicle body frame can be established as shown in FIG. 7. Let the baseline be the x-axis, z-axis parallel to optical axis and origin at the center of baseline, and the image coordinates in left and right images be $(x_l', y_l')$ and $(x_r', y_r')$, respectively. Then $4 x_l'/f = x+b/2$ z, $x_r'/f = x-b/2$ z and $y_l'/f = y_r'/f = y z$ where f is the focal length.

from the above equations, we get $5x = b(x_l' + x_r')/2x_l' - x_r'$, $y = b(y_l' + y_r')/2x_l' - x_r'$, and $z = b f x_l' - x_r'$.

According to the optical principle, if pixel resolution $r_p$ is known, we have $x_l' = f \tan(r_p x_{pl})$, $y_l' = f \tan(r_p y_{pl})$ $x_r' = f \tan(r_p x_{pr})$, $y_r' = f \tan(r_p y_{pr})$ where $(x_{pl}, y_{pl})$ and $(x_{pr}, y_{pr})$ are pixel coordinates in the left and right images, respectively. Hence, the target position with respect to the vehicle frame can be calculated.

Referring to FIGS. 1-7, the method of three dimensional positioning according to the preferred embodiment of the present invention is illustrated, which comprises the steps as follows:

(1) Receive images from the EO sensors and send them to the preprocessing module 1.

(2) Perform Median Filtering to suppress noise in the Median Filter module 11 and Histogram Equalization to enhance the images in the Histogram Equalization module 12. If the object image library is black, invert the image in the Inverse Image module 13.

(3) Receive preprocessed images from the preprocessing module 1 and perform Threshold Black/White in the Threshold/White module 21, Suppress Black in the Suppress Black module 22, Suppress White in the Suppress White module 23, and edge detection in the Sobel Filter module 24.

(4) Receive segmented images from the segmentation module 2 and perform Line Detection in the Line Detection Module 31, Circle Detection in the Circle Detection module 32 and Eigenvector Projection in the Eigenvector Projection module 35.

(5) Receive the preprocessed images from the preprocessing module 1 and perform Corner Detection in the Corner Detection module 33, fiducial feature detection in the Gabor Filter module 34. Send detected corners and fiducial features to the 3D Positioning module 6 and the Recognition module 4.

(6) Receive the detected corners from the Corner Detection module 33, match the corners in the two images to get the disparities, and calculate 3D positions for each corner pair in the 3D Positioning module 6.

(7) Receive the detected fiducial features from the Gabor Filter module 34, match the corners in the two images to get the disparities, and calculate 3D positions for each corner pair in the 3D Positioning module 6.

(8) Receive detected lines, circles, corners and fiducial features from the Detection module 3, get the detected corners and fiducial 3D positions from the 3D Positioning module 6, group them in the Graph Matching module 42, Corner Classifier module 43 and Neural network module 44, to identify certain object.

(9) Receive the recognized certain object in the Relative Position Tracking module 53, wherein the recognized certain object includes calculated 3D corners and fiducial features, to get the 3D target position.

Referring to FIGS. 1-7, an alternative method of three dimensional positioning according to the preferred embodiment of the present invention is illustrated, which comprises the steps as follows:

(1) Receive the images from the EO sensors and send them to the preprocessing module 1.

(2) Perform Median Filtering to suppress noise in the Median Filter module 11 and Histogram Equalization to enhance the images in the Histogram Equalization module 12. If the object image library is black, invert the image in the Inverse Image module 13.

(3) Receive preprocessed images from the preprocessing module 1 and perform Threshold Black/White in the Threshold/White module 21, Suppress Black in the Suppress Black module 22, Suppress White in the Suppress White module 23, and edge detection in the Sobel Filter module 24.

(4) Receive segmented images from the segmentation module 2 and perform Line Detection in the Line Detection Module 31, Circle Detection in the Circle Detection module 32 and Eigenvector Projection in the Eigenvector Projection module 35.

(5) Receive preprocessed images from the preprocessing module 1 and perform Corner Detection in the Corner Detection module 33, fiducial feature detection in the Gabor Filter module 34. Send detected corners and fiducial features to the 3D Positioning module 6 and the Recognition module 4.

(6) Receive the detected corners from the Corner Detection module 433, match the corners in the two images to get the disparities, and calculate 3D positions for each corner pair in the 3D Positioning module 46.

(7) Receive the detected fiducial features from the Gabor Filter module 34, match the corners in the two images to get the disparities, and calculate 3D positions for each corner pair in the 3D Positioning module 6.

(8) Receive GPS measurements, including position, velocity and time from the global positioning system 9, and pass them to the AHRS/INS/GPS integration module 8.

(9) Receive inertial measurements including body angular rates and specific forces, from the inertial measurement unit 10, and send them to the AHRS/INS/GPS integration module 8 which is a signal-processing module.

(10) Perform inertial navigation system (INS) processing in the AHRS/INS/GPS integration module 8.

(11) Receive the laser ranger measurement from a laser ranger 11' and send it to the recognition module 4.

(12) Receive the preprocessed images from the preprocessing module 1, match the processed target template and output to the Peak Tracking module 51 or Centroiding Tracking module in the Tracking module 52.

(13) Receive detected lines, circles, corners and fiducial features from the Detection module 3, get the detected corner and fiducial 3D positions from the 3D Positioning module 6, group them in the Graph Matching module 42, Corner Classifier module 43 and Neural network module 44, to identify the certain object.

(14) Relative Position Tracking module 53 receives the recognized certain object, which comprises calculated 3D corners and fiducial features, to get the 3D target position.

According to the preferred embodiment of the present invention, Step (12) further comprises of the following steps (as shown in FIG. 1):

(12-1) Retrieve the target knowledge database to get the target template, receive the attitude and azimuth from the AHRS/INS/GPS Integration module 8, and rotate the target template in the Matched Filter module 41.

(12-2) Receive the laser range from the Laser Ranger module 11, and shrink or enlarge the processed images from step (1) in the Matched Filter module 41.

(12-3) Do the Match Filter in the Matched Filtering module 41.

The present invention employs electro-optic image sensors integrated global positioning system/inertial measurement unit and laser ranger, to provide reliable and real time object 3D position. These data can be used by an autonomous vehicle or a robot controller. The advantages of the present invention include:

(1) The electro-optic image sensors' measures the feature and corner 3D positions. The 3D positions can be grouped with detected lines and circles for the recognition of certain objects, such as fork holes, pallets, etc.

(2) The IMU/GPS integration system provides the vehicle's attitude and azimuth so as to rotate the target library in the sensor/target knowledge database in order to match the electro-optic sensors' images. This dramatically reduces the storage volume and matching time. It is not necessary to store different kinds of objects in orientation in the sensor/target knowledge database and match the object at different orientations.

(3) The laser ranger measures the distance between the object and vehicle. This reliable distance can be used to calibrate the 3D electro-optic sensors' position. It can also be used to shrink and enlarge the target library in the sensor/target knowledge database in order to match the electro-optic sensors' images. This dramatically reduces the storage volume and matching time.

In another preferred embodiment, this invention developed a miniaturized GPS/MEMS IMU integrated navigation system. The following are the requirements and problem identification of this embodiment.

NASA AERCam 1''s responsibilities include:
Allow orbiter intravehiclar activity (IVA) crews to observe Extravehiclar Activities (EVAs)
Inspect a location without an EVA
View a location not visible to an EVA crew member or remote manipulator system camera
Can be used to directly support an EVA by giving IVA crew members the ability to freely move their eyepoint The missions assure a precise navigation solution to the AERCam 1'. Autonomous AERCam 1' navigation requires precise determination of the relative position and attitude in relation to the ISS 2'. The relative position and attitude information is relayed to the control station so that the crew can control the AERCam 1' in real-time. The navigation system has the capability to provide its location relative to the ISS 2' to perform automated maneuvers in case of the loss of communications, or other contigency situations. In other words, the autonomous AERCam 1' navigation system provides self-contained relative navigation with crew-in-the-loop, as well as fully autonomous operation without instructions from the control station.

Figure 8:
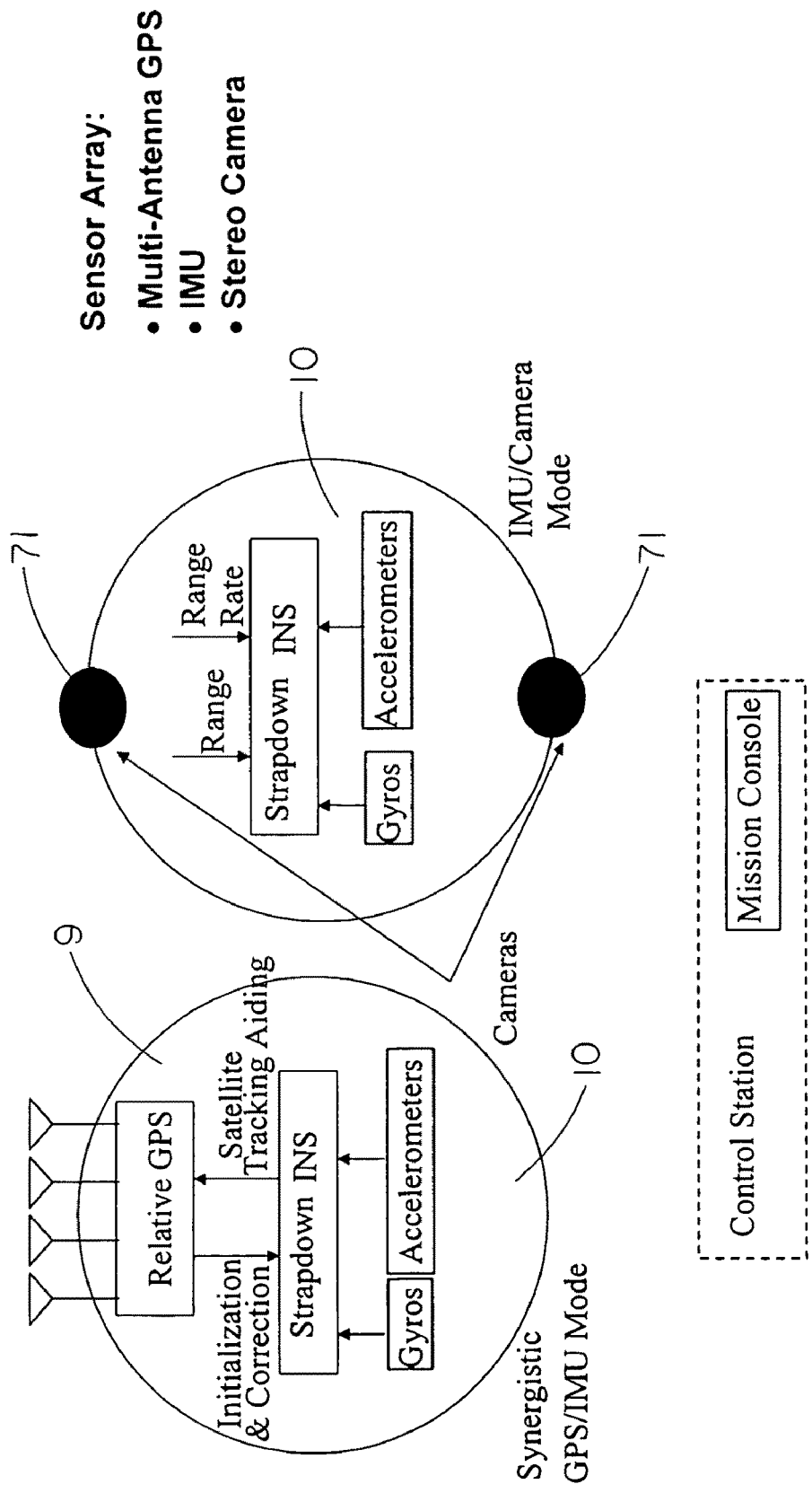
FIG. 8 is a block diagram of the GPS/IMU/Camera navigation structure.

This invention develops an intelligent automated system that utilizes multiple sensors (GPS 9, IMU 10 and Cameras 71) to realize autonomous navigation for the AERCam 1' 1' with capabilities to perform highly precise relative attitude and position determination, intelligent robust failure detection and isolation, advanced collision avoidance, and onboard situational awareness for contingency operations. The autonomous AERCam 1' navigation system provides self-contained relative navigation with crew-in-the-loop, as well as fully autonomous operation without instructions from the control station. The proposed multi-sensor system design with redundancy for the AERCam 1' is shown in FIG. 8.

A space-borne GPS interferometric receiver with multiple antennas can provide absolute measurements such as the Earth orbiter's position, velocity, as well as attitude. In the relative navigation system, two GPS receivers are installed, one on the AERCam 1' and one on the ISS 2' 2', to provide precise relative position at the centimeter level and relative attitude information. Because of the integration with the INS, the critical requirement on the GPS receiver for receiving at least 4 GPS satellites is waived. This allows the proposed navigation system to work in close proximity operations. When the relative GPS attitude is unavailable due to the misalignment between the AERCam 1' vehicle and the ISS 2' 2', and/or signal blockage, the integrated system continues relative attitude determination in the IMU/camera mode. Due to the drift of the IMU sensors, the INS position errors increase with time. This IMU shortcoming is compensated by the GPS or camera when GPS navigation data or images are available.

When the AERCam 1' is far away from the ISS 2' 2', the relative GPS provides the navigation data. In addition, GPS data is used to compensate the INS errors and drift. For this case, the AERCam 1' navigation system works under the GPS/INS integration mode. When the AERCam 1' is close to the ISS 2' 2', the GPS signals may be lost due to blockage or multipath noise. We use the baseline signal-to-noise ratio (SNR) to detect the existence of multipath. A robust Kalman filter multipath mitigation algorithm is applied to eliminate the multipath effect based on the SNR measurement and computed SNR profile.

The system operation scenarios include:

Fully-Coupled GPS/IMU integration mode under the condition of favorable geometry among the GPS satellites, the AERCam 1' and the ISS 2' 2', when the AERCam 1' is far away from the ISS 2' 2' (remote operation). Under this operation mode, the IMU-derived velocity information is used to aid the carrier phase and code tracking loops of the GPS receiver to improve the dynamic performance as well as the signal-to-noise (SNR) ratio. The GPS data is used to compensate the IMU sensor errors and computational errors.

IMU/Camera integration mode under the condition of:
  GPS signal blockage;
  large multipath noise;
  Unfavorable geometry among the GPS satellites, the AERCam 1' and the ISS 2' 2'.

The INS navigation errors grow with time and need to be estimated and reset frequently during the mission. For the proximity operation, the range and range rate between the AERCam 1' and the ISS 2' 2' are blended to compensate the IMU sensor drift during GPS outages or unreliable GPS data.

Periodically the Laser Dynamic Range Imager (LDRI) is used to align the AERCam 1' navigation system. The LDRI is installed on the ISS 2' 2' and can take a 3-dimensional image of the AERCam 1' to derive range, range rate and attitude information of the AERCam 1' once the AERCam 1' is in the field of view (FOV) of the LDRI. The LDRI alignment technique is a feasible solution for reducing the errors of the AERCam 1' navigation system when GPS is not available.

Aligning the INS with GPS data. GPS data compensates the IMU errors when GPS becomes available.

Figure 9:
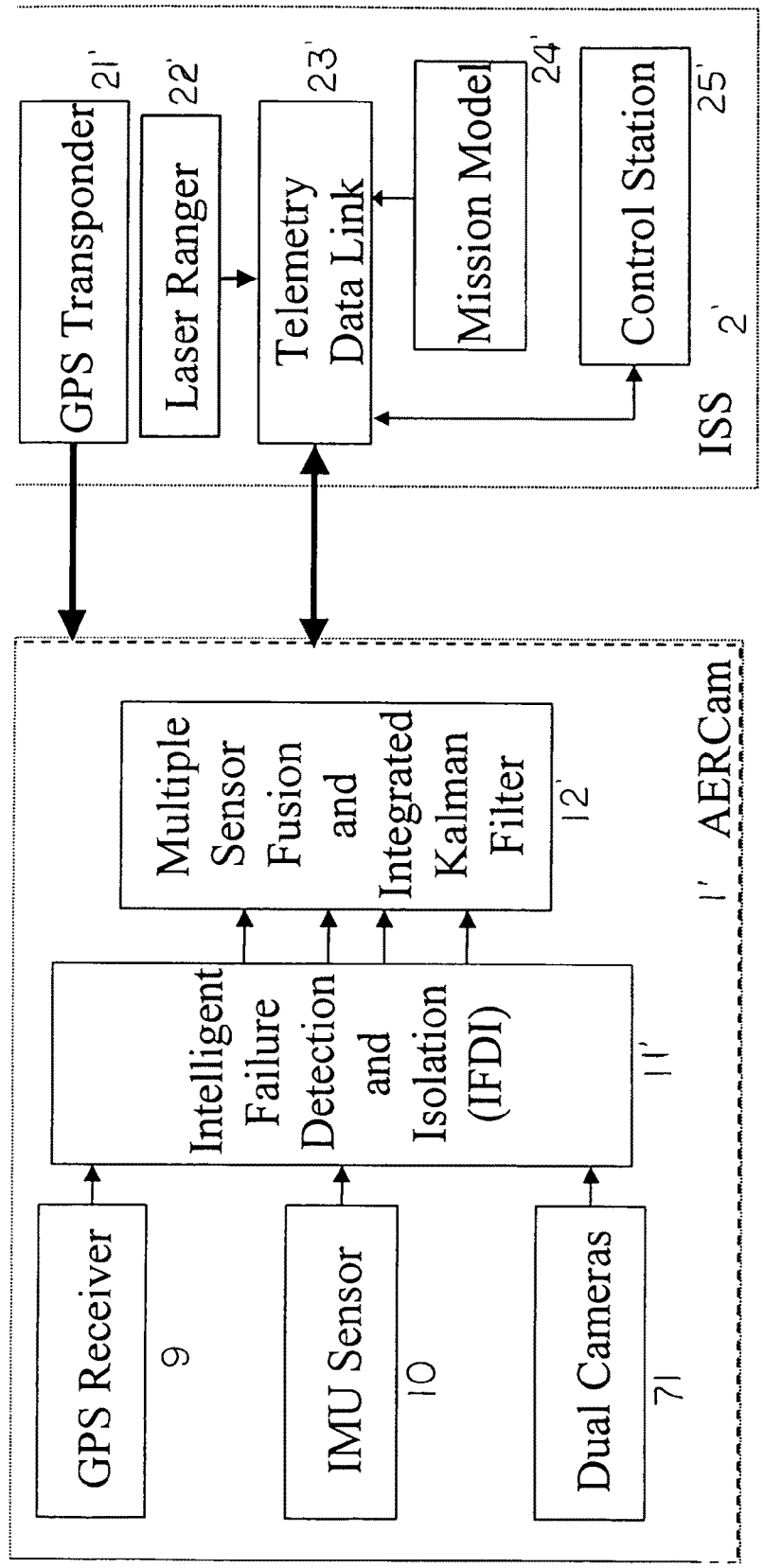
FIG. 9 is a block diagram of the intelligent autonomous relative navigation using multi-sensors.

Interferometric GPS processing for attitude determination. The following disclose the Optimal Multi-Sensor Navigation System Design with Redundancy Top Level Design An optimal multi-sensor navigation architecture, as shown in FIG. 9, takes full advantage of heterogeneous sensors to provide seamless autonomous navigation for the AERCam 1'. The involved navigation sensors are relative GPS, Inertial Measurement Unit (IMU), and cameras installed on AERCam 1'. All raw measurements from all individual sensors are injected into a data fusion system to derive precisely relative position and attitude information.

Relative GPS requires that the AERCam 1' and the ISS 2' track at least four common GPS satellites simultaneously. The relative GPS system works well when the ISS 2' and the AERCam 1' are widely separated due to good geometry formed between the AERCam 1', the ISS 2', and the GPS satellites. Relative GPS-alone may intermittently fail when the AERCam 1' maneuvers into the proximity of the ISS 2' because of occasional strong multipath signal and GPS signal blockage. This GPS weakness is compensated by optimally blending it with the IMU data, such as gyro and accelerometer measurements.

Three accelerometers and three gyros are used in this multi-sensor based navigation system to provide three-dimensional position and attitude solutions. IMU sensors are self-contained motion-sensitive devices. The gyros measure the angular rate and the accelerometers measure the linear motions of the platform. When the GPS solution is available, the Inertial navigation system (INS) is initialized using the GPS solution. In close proximity, the INS tracks the position and attitude of the AERCam 1' relative to the ISS 2'.

The INS navigation errors grow with time and need to be estimated and reset frequently during the mission. For the close proximity operation, the available GPS signals and the cameras are used to aid the INS to maintain highly accurate relative navigation. The range and range rate between the AERCam 1' and the ISS 2' are blended in the multi-sensor fusion algorithm to compensate for the EMU sensor drifts during GPS outage or unreliable GPS data.

Figure 10:
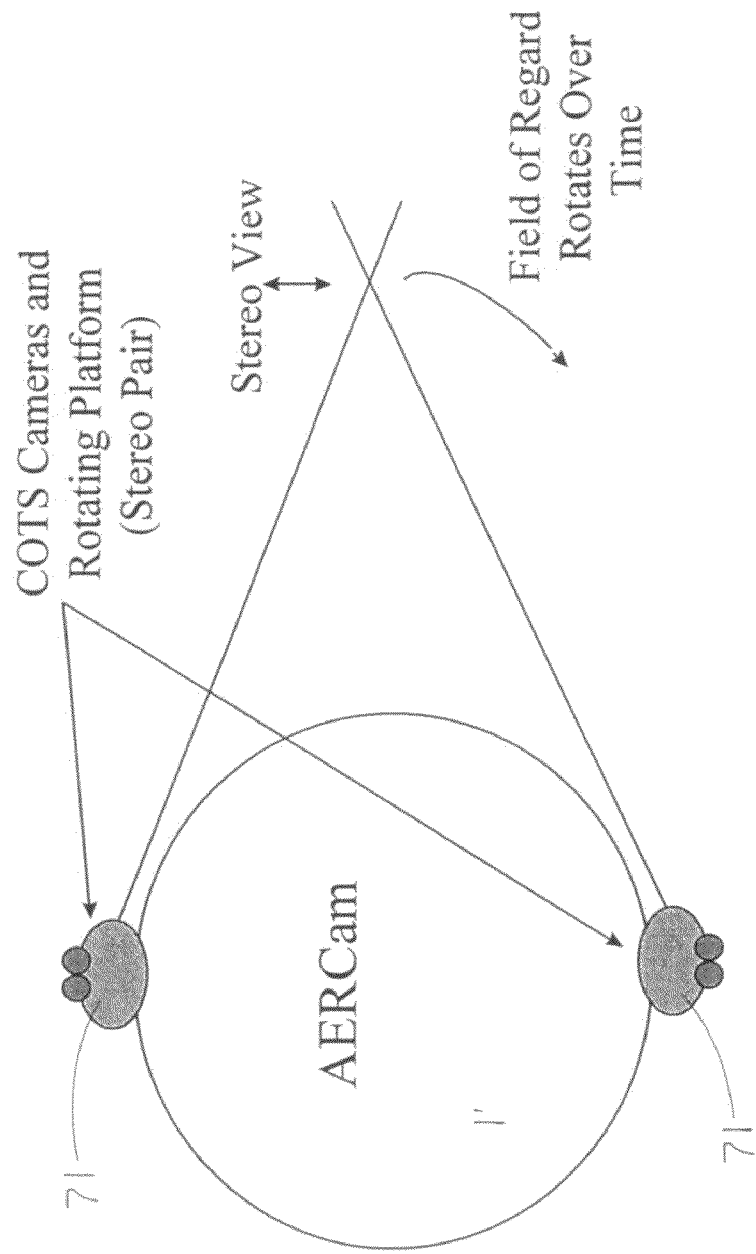
FIG. 10 illustrates the top level diagram of the proximity sensing system that incorporates dual video cameras mounted on rotating platforms at the poles of the AERCam 1'. The video cameras rotate in a synchronized fashion to generate stereo images that provide 360 degree coverage about the AERCam 1'. Range and range-rate estimates are derived from the image data.

The two cameras installed on the AERCam 1' are used to image the ISS 2', as shown in FIG. 10. These images are further processed via correlation and coordinate transformations techniques to derive the range and the range rate between the AERCam 1' and the ISS 2'. It may not be possible to derive the range and range rate on-board of the AERCam 1' because of the computational requirements. In such case, the image parameters may be transmitted to the control station which performs the computation, and possibly transmits the range and range rate back to the AERCam 1'.

A novel sensor validation approach by using neural networks is used to perform intelligent failure detection and isolation (IFDI) for multiple disparate navigation sensors. Failure detection and isolation technology plays an important role in the fully autonomous navigation system. An auto-associative neural network, which has four hidden layers for information compression and data regeneration, is trained to generate filtered sensor estimates for all sensors even though some of the sensor measurements have been corrupted by noise, disturbances or failures. This lessens the impact of a failed sensor on the network output. The failure isolation by the neural network is achieved by blocking out the weights directly connected to the failed sensor in the network input.

Miniature MEMS IMU

AGNC's MEMS coremicro IMU can support the AERCam 1' navigation system with features of low power consumption, lightweight, and small size.

Formulation of Relative Navigation Using GPS Carrier Phase

The objective of relative navigation is to determine continuously the coordinates of an unknown point with respect to a known point, such as the ISS 2'. In other words, relative navigation of AERCam 1' aims at the determination of the vector between the AERCam 1' and the ISS 2'. Introducing the corresponding position vector $\vec{X}_{AERCam}$ and $\vec{X}_{ISS}$, the relation can be formulated as:

$$\vec{X}_{ISS} = \vec{X}_{AERCam} + \vec{b} \tag{0.1}$$

where $\vec{b}$ is the vector pointing from the AERCam 1' to the ISS 2'. The components of the vector $\vec{b}$ are $$\vec{b} = \begin{bmatrix} X_{ISS} - X_{AERCam} \\ Y_{ISS} - Y_{AERCam} \\ Z_{ISS} - Z_{AERCam} \end{bmatrix} = \begin{bmatrix} \Delta X \\ \Delta Y \\ \Delta Z \end{bmatrix} \tag{0.2}$$

GPS relative navigation for the AERCam 1' is effective if simultaneous observations are made at both the AERCam 1' and the ISS 2'. Simultaneity means that the observation time tags for the AERCam 1' and the ISS 2' are the same. Assuming such simultaneous observations at the AERCam 1' and the ISS 2' to two satellites i and j, linear combinations can be formed leading to single-differences and double-differences between observables of the GPS signal from multiple antennas and multiple satellites.

GPS Carrier Phase Model

Highly accurate positioning with GPS can be obtained by using of carrier phase observables. A general GPS carrier phase model is given by:

$$\Phi = \frac{1}{\lambda}\rho + f\delta - N + \frac{d_{eph}}{\lambda} - \frac{d_{iono}}{\lambda} + \frac{d_{trop}}{\lambda} + \varepsilon \quad (0.3)$$

where
- $\Phi$ = the GPS carrier phase measurement (in wavelength);
- $\lambda$ = the signal wavelength;
- $\rho$ = the true geometric distance between the GPS receiver and satellite;
- f = the signal frequency;
- $\delta = \delta^S - \delta_R$ the clock error, $\delta^S$ is the satellite clock bias, $\delta_R$ is the receiver clock error;
- N = the carrier phase integer ambiguity;
- $d_{eph}$ = the range error induced by ephemeris error;
- $d_{iono}$ = the propagation error induced by the ionosphere;
- $d_{trop}$ = the propagation error induced by the troposphere;
- $\varepsilon$ = the phase noise.

For the ISS 2' and the AERCam 1', the carrier phase model is slightly different from the above equation, because there is essentially no air above 400 kilometers from the Earth's surface. Without the atmospheric effects impacting on the GPS carrier phase, the carrier phase measurement model for the ISS 2' and the AERCam 1' is:

$$\Phi = \frac{1}{\lambda}\rho + f\delta - N + \frac{d_{eph}}{\lambda} - \frac{d_{iono}}{\lambda} + \varepsilon \quad (0.4)$$

Single-Difference Carrier Phase Model

There is an assumption that both of the ISS 2' and the AERCam 1' have a carrier phase GPS receiver. Based on the carrier phase measurement model given in equation (2), we obtain the ISS 2' and AERCam 1' carrier phase measurements:

$$\Phi_{ISS}^{(j)}(k) = \frac{1}{\lambda}\rho_{ISS}^{(j)}(k) + f(\delta_S^{(j)}(k) - \delta_{ISS}(k)) - N_{ISS}^{(j)} + \frac{d_{eph}^{(j)}(k)}{\lambda} - \frac{d_{iono}^{(j)}(k)}{\lambda} + \varepsilon_{ISS}^{(j)}(k) \quad (0.5)$$

$$\Phi_{AERCam}^{(j)}(k) = \frac{1}{\lambda}\rho_{AERCam}^{(j)}(k) + f(\delta_S^{(j)}(k) - \delta_{AERCam}(k)) - N_{AERCam}^{(j)} + \frac{d_{eph}^{(j)}(k)}{\lambda} - \frac{d_{iono}^{(j)}(k)}{\lambda} + \varepsilon_{AERCam}^{(j)}(k) \quad (0.6)$$

where, k is the carrier phase measuring epoch; superscript (j) means that the corresponding items are related with the GPS satellite j; subscript ISS 2' means that the corresponding items are related to the ISS 2' GPS receiver; subscript AERCam 1' means that the corresponding items are related to the AERCam 1' GPS receiver.

By subtracting (2.6) from (2.5), the single differential carrier phase measurement is obtained as follows:

$$\nabla\Phi^{(j)}(k) = \frac{1}{\lambda}\rho_{12}^{(j)}(k) - f\delta_{12}(k) - N_{12}^{(j)} + \varepsilon_{12}^{(j)}(k) \quad (0.7)$$

where, $$\nabla\Phi^{(j)}(k) = \Phi_{ISS}^{(j)}(k) - \Phi_{AERCam}^{(j)}(k) \quad (0.8)$$

$$\rho_{12}^{(j)}(k) = \rho_{ISS}^{(j)}(k) - \rho_{AERCam}^{(j)}(k) \quad (0.9)$$

$$\delta_{12}(k) = \delta_{ISS}(k) - \delta_{AERCam}(k) \quad (0.10)$$

$$N_{12}^{(j)} = N_{ISS}^{(j)} - N_{AERCam}^{(j)} \quad (0.11)$$

$$\varepsilon_{12}^{(j)}(k) = \varepsilon_{ISS}^{(j)}(k) - \varepsilon_{AERCam}^{(j)}(k) \quad (0.12)$$

The benefit of forming single differential carrier phase measurement is the cancellation of the satellite related common errors, such as the satellite clock error and the ephemeris error, etc.

Double-Difference Carrier Phase Model

Assuming two satellites i and j are observed, two single-difference carrier phase measurements according to equation (2.7) can be formed. These single-difference carrier phase measurements are subtracted to obtain the double-difference carrier phase measurement:

$$\Delta\nabla\Phi^{(ij)}(k) = \frac{1}{\lambda}\rho_{12}^{(ij)}(k) - N_{12}^{ij} + \varepsilon_{12}^{ij}(k) \quad (0.13)$$

where, $$\Delta\nabla\Phi^{(ij)}(k) = \begin{bmatrix} \Phi_{ISS}^{(j)}(k) - \\ \Phi_{AERCam}^{(j)}(k) \end{bmatrix} - \begin{bmatrix} \Phi_{ISS}^{(i)}(k) - \\ \Phi_{AERCam}^{(i)}(k) \end{bmatrix} \quad (0.14)$$

$$\rho_{12}^{(ij)}(k) = \rho_{ISS}^{(j)}(k) - \rho_{AERCam}^{(j)}(k) - \rho_{ISS}^{(i)}(k) + \rho_{AERCam}^{(i)}(k) \quad (0.15)$$

$$N_{12}^{(ij)} = N_{ISS}^{(j)} - N_{AERCam}^{(j)} - N_{ISS}^{(i)} + N_{AERCam}^{(i)} \quad (0.16)$$

$$\varepsilon_{12}^{(ij)}(k) = \varepsilon_{ISS}^{(j)}(k) - \varepsilon_{AERCam}^{(j)}(k) - \varepsilon_{ISS}^{(i)}(k) + \varepsilon_{AERCam}^{(i)}(k) \quad (0.17)$$

This time, in addition to removing the satellite clock errors, the GPS receiver-related common errors for the ISS 2' and the AERCam 1' are eliminated by the double-difference carrier phase measurements.

Relative Navigation Using Single-Difference Carrier Phase

When the model of single differential carrier phase is considered, the terms comprising unknowns in nonlinear form are $\rho_{ISS}^{(j)}(k)$ and $\rho_{AERCam}^{(j)}(k)$. Because the AERCam 1' moves in the proximity area around the ISS 2', we can use an initial position $\vec{X}_0 = (X_0, Y_0, Z_0)$ for both the AERCam 1' and the ISS 2' to linearize the terms of $\rho_{ISS}^{(j)}(k)$ and $\rho_{AERCam}^{(j)}(k)$. Having this initial position, the unknowns of the AERCam 1' position and the ISS 2' position can be decomposed as $$X_{AERCam} = X_0 + \Delta X_{AERCam}$$

$$Y_{AERCam} = Y_0 + \Delta Y_{AERCam}$$

$$Z_{AERCam} = Z_0 + \Delta Z_{AERCam} \quad (0.18)$$

$$X_{ISS} = X_0 + \Delta X_{ISS}$$

$$Y_{ISS} = Y_0 + \Delta Y_{ISS}$$

$$Z_{ISS} = Z_0 + \Delta Z_{ISS} \quad (0.19)$$

where now $(\Delta X_{AERCam}, \Delta Y_{AERCam}, \Delta Z_{AERCam})$ and $(\Delta X_{ISS}, \Delta Y_{ISS}, \Delta Z_{ISS})$ are the new unknowns. By expanding $\rho_{AERCam}^{(j)}(k)$ and $\rho_{ISS}^{(j)}(k)$ as a Taylor series with respect to the approximate point, we obtain $$\rho_{AERCam}^{(j)} \approx \|\vec{X}^{(j)} - \vec{X}_0\| - \frac{X^{(j)} - X_0}{\|\vec{X}^{(j)} - \vec{X}_0\|} \Delta X_{AERCam} - \qquad (0.20)$$
$$\frac{Y^{(j)} - Y_0}{\|\vec{X}^{(j)} - \vec{X}_0\|} \Delta Y_{AERCam} - \frac{Z^{(j)} - Z_0}{\|\vec{X}^{(j)} - \vec{X}_0\|} \Delta Z_{AERCam}$$

$$\rho_{ISS}^{(j)} \approx \|\vec{X}^{(j)} - \vec{X}_0\| - \frac{X^{(j)} - X_0}{\|\vec{X}^{(j)} - \vec{X}_0\|} \Delta X_{ISS} - \qquad (0.21)$$
$$\frac{Y^{(j)} - Y_0}{\|\vec{X}^{(j)} - \vec{X}_0\|} \Delta Y_{ISS} - \frac{Z^{(j)} - Z_0}{\|\vec{X}^{(j)} - \vec{X}_0\|} \Delta Z_{ISS}$$

Therefore, the GPS relative navigation equation using single differential carrier phase is given by $$[\nabla \Phi^{(j)} + N_{12}^{(j)}]\lambda = \qquad (0.22)$$
$$-\frac{X^{(j)} - X_0}{\|\vec{X}^{(j)} - \vec{X}_0\|} \Delta X - \frac{Y^{(j)} - Y_0}{\|\vec{X}^{(j)} - \vec{X}_0\|} \Delta Y - \frac{Z^{(j)} - Z_0}{\|\vec{X}^{(j)} - \vec{X}_0\|} \Delta Z - f\delta_{12}$$

After fixing the carrier phase integer ambiguity, there are four unknowns in the above equation. They are the three dimensional coordinates of the ISS 2' relative position with respect to the AERCam 1' and the receiver clock bias $f\delta_{12}$. Consequently, four satellites are needed to solve this problem.

Relative Navigation Using Double-Difference Carrier Phase

Similarly, after establishing the double-difference carrier phase integer ambiguity, the GPS relative navigation equation using double-difference carrier phase measurements is given by $$[\Delta \nabla \Phi^{(ij)} + N_{12}^{ij}]\lambda = \left[\frac{X^{(i)} - X_0}{\|\vec{X}^{(i)} - \vec{X}_0\|} - \frac{X^{(j)} - X_0}{\|\vec{X}^{(j)} - \vec{X}_0\|}\right]\Delta X + \qquad (0.23)$$
$$\left[\frac{Y^{(i)} - Y_0}{\|\vec{X}^{(i)} - \vec{X}_0\|} - \frac{Y^{(j)} - Y_0}{\|\vec{X}^{(j)} - \vec{X}_0\|}\right]\Delta Y +$$
$$\left[\frac{Z^{(i)} - Z_0}{\|\vec{X}^{(i)} - \vec{X}_0\|} - \frac{Z^{(j)} - Z_0}{\|\vec{X}^{(j)} - \vec{X}_0\|}\right]\Delta Z$$

Using double-difference carrier phase relative positioning, three GPS satellites are needed to solve for the three ISS 2'-to-AERCam 1' relative position components $\Delta X$, $\Delta Y$ and $\Delta Z$.

Miniature MEMS IMU

The potential impact on the MEMS IMU accuracy can be mitigated via smart integration algorithms with other navigation sensors.

Sources of rate sensors and accelerometers have been sought out. Characteristics of the sensors were obtained so that models of the MEMS based IMU can be generated for simulations of the AERCam 1' navigation system. This include sensor biases, drift rates, response times and noise sources.

MEMS IMU Error Model

Gyro Errors

The gyro errors can be generally described by the total gyro drift rate. A typical MEMS gyro drift rate is $$\text{drift rate}(\epsilon) = \epsilon_B + \epsilon_R + \Delta K_g \omega_{in} + \epsilon_d + \epsilon_g + \epsilon_T(T) + \epsilon_{non} + \ldots \qquad (0.1)$$

where $\epsilon_B$=Bias and random drift, caused by torquer coils, constant disturbing torque, friction and other reasons, differs slightly each time the instrument is turned on and will fluctuate randomly with time. The drift can be determined through testing at the laboratory or compensated with a random constant in the integrated Kalman filter, or gyros themselves are slowly rotated in order to average-out their bias drift.

$\epsilon_R$=Gyro time-dependent random drift. The drift is estimated as a stochastic process in the integrated Kalman filter.

$\Delta K_g \omega_{in}$=Gyro scale factor error, is proportional to the input angular rate and becomes quite remarkable in a high dynamic environment. $\Delta K_g$ is generally unknown and must be estimated during dynamic calibration.

$\epsilon_d$=The error caused by the angular motion of the flight vehicle, is a systematic error and can be compensated by analytical methods in the design.

$\epsilon_g$=The error caused by the linear motion of the flight vehicle, including mass-unbalance drift, anisoelastic drift and others. The error is proportional to vehicle acceleration and can be compensated by analytical or experimental methods.

$\epsilon_T(T)$=Temperature-dependent gyro drift. This temperature coefficient of drift determines the necessity for the thermal control of the gyro.

$\epsilon_{non}$=Gyro nonlinear error, could be rather large while the gyro experiences a large input angular rate. The nonlinear error is a systematic error and can be compensated by analytical methods.

Accelerometer Errors

Several factors make an accelerometer deviate from its ideal value, such as, the angular motion and the acceleration motion, random bias, scale factor, dead zone, cross-axis sensitivity, temperature and others. A typical MEMS accelerometer error model is expressed as:

$$\text{bias}(\nabla) = \nabla_B + \nabla_R + \Delta K_a f_{in} + \nabla_d + \nabla_g + \nabla_T(T) + \nabla_{non} + \ldots \qquad (0.2)$$

where $\nabla_B$=Bias and random constant error, caused by dead zone, disturbing forces, hysteresis, etc. This bias is slightly different each time the instrument is turned on and will slowly vary randomly with time. The uncompensated residual causes navigation errors.

$\nabla_R$=Time-dependent random bias. The random bias is a critical error to accelerometer performance. Therefore, the bias must be estimated and corrected with a stochastic process in the integrated Kalman filter.

$\Delta K_a f_{in}$=Scale factor error of accelerometer. This error is proportional to the input specific force, and it can be quite remarkable in a high dynamic environment. $\Delta K_a$ is generally unknown and must be determined during dynamic calibration.

$\nabla_d$=The error caused by the translational motion of the flight vehicle, is a systematic error and can be compensated by analytical methods in the design.

$\nabla_g$=The error caused by the linear motion of the flight vehicle, including mass-unbalance drift, anisoelastic drift and others. The error is proportional to vehicle acceleration and can be compensated by analytical or experimental methods.

$\nabla_T(T)$=Temperature-dependent accelerometer drift. This temperature coefficient of drift determines the necessity for the thermal control of the accelerometer.

$\nabla_{non}$=Accelerometer nonlinear error. The nonlinear error is a systematic error and can be compensated by analytical methods.

The MEMS IMU error models were embedded in the hardware-in-the-loop simulation and test system.

Miniature GPS/MEMS IMU Integrated Filtering Integration Architecture Design

Figure 11:
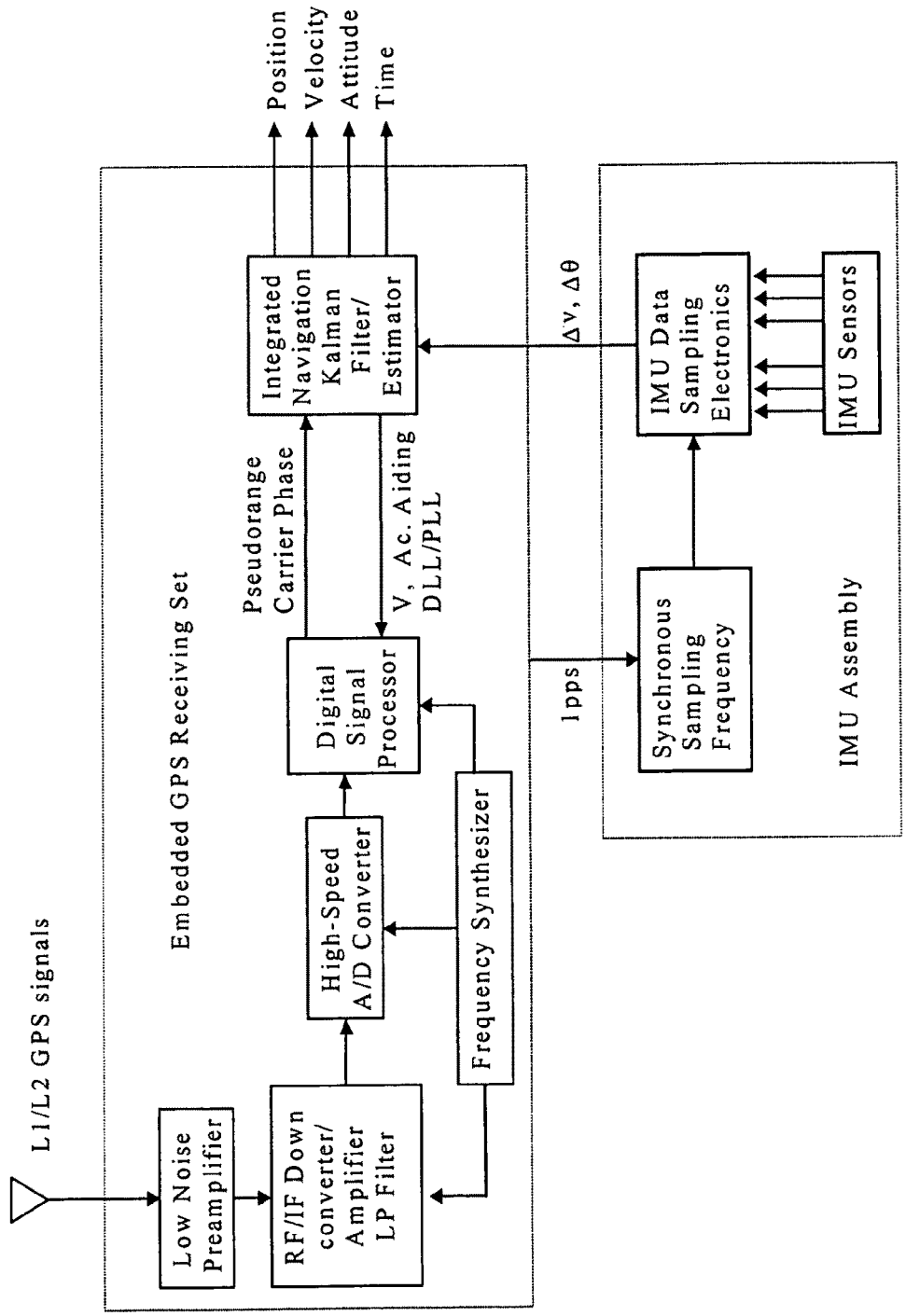
FIG. 11 is a block diagram of the AGNC's fully coupled GPS/IMU navigation system architecture.

The IMU navigation solution drifts with time. A GPS solution can effectively correct the IMU navigation solution. On the other hand, a stand-alone GPS receiver suffers from intermittent loss of the GPS signal due to high-dynamic vehicle maneuvering, interference, jamming or multipath signals. It is very important to strengthen GPS signal tracking to reduce the possibility of the loss of a GPS signal. It is well known that there exists the usual loop bandwidth versus dynamic performance tradeoff commonly encountered in GPS signal tracking loop design: the effects of noise increase with increasing loop bandwidth, while dynamic tracking errors increase with decreasing loop bandwidth. To resolve the conflict between the GPS signal tracking loop dynamics versus noise performace, it is recommended that the acquisition and tracking processes of the GPS signals should be aided by the INS to extend its dynamics while maintaining the minimum tracking loop bandwidth. An appropriate architecture for a fully-coupled GPS/MEMS IMU integrated system is one that provides the mechanics of using the GPS solution to aid the inertial navigation system (INS) and using the INS solution to aid the code and carrier tracking of a GPS receiver. The fully-coupled GPS/INS integration architecture is given in FIG. 11.

The above fully coupled GPS/IMU navigation system architecture has the following important features:

Hardware-level redundancy: In the integration mode, the GPS receiving set is used as one of the sensors (GPS, gyro and accelerometer) of the integrated navigation system. The restriction of at least 4 satellites for navigation solution computation can be significantly relaxed. The hardware-level redundancy will help to enhance the reliability of the overall system through fault-tolerant software design.

Low-cost IMU sensors: In the fully coupled GPS/IMU system, precise positioning results can be used to routinely correct IMU instrument errors in flight. Therefore, low-cost non-INS-grade inertial sensors can be utilized in the integrated navigation system.

Minimum tracking loop bandwidth and high anti-interference: In the integration mode, the V-A solution of the integration filter is transferred as V-A information along the line-of-sight between the GPS satellites and the integrated system, and fed back at a high rate to the GPS digital signal processor. In the signal processor, the V-A information is used to compensate for the spacecraft high dynamics. Therefore, the fixed bandwidth of the tracking loop can be reduced to a minimum to prevent unwanted interference noise.

Fast Phase Ambiguity resolution/cycle slip detection on-the-fly: The precise positioning results of the integrated system can generate the computed range between satellites and the navigation system. The computed range is compared with the measured range between the satellites and the navigation system, and the resultant difference can be utilized to detect cycle slip and reduce the ambiguity search space efficiently.

High navigation accuracy: The fully coupled GPS/IMU system uses the kinematic GPS technique with centimeter-level measurement accuracy to significantly improve the navigation accuracy. Once atmospheric delays and selective availability (using dual-frequency and an authorized GPS receiving set), phase ambiguity and cycle slip problems are solved, the navigation accuracy of the integrated system only depends on the IMU instrument errors. The system is designed to perform IMU dynamic corrections and alignment. Furthermore, the integrated navigation output is at the rate of the INS output.

The GPS receiving set in the system must provide raw pseudorange and carrier phase observables for the integrated navigation Kalman filter and a synchronous timing signal for the data sampling electronics of the IMU. Asynchronous velocity-acceleration (V-A) aiding information may cause the tracking loops to lose lock. Therefore, the GPS receiving set must be designed to have a high-speed interface at a rate of 100 Hz or more for the tracking loops, and a slow-speed interface at a rate of 1-10 Hz for the integrated navigation Kalman filter. The IMU sensors electronics must provide $\Delta v$-$\Delta\theta$ (acceleration and angular rate) information for the integrated navigation Kalman filter. The $\Delta v$-$\Delta\theta$ information is synchronized with the GPS measurements through a synchronous timing signal. The IMU instrument errors are corrected in the integrated navigation Kalman filter. Therefore, there is only one high-speed interface between the navigation Kalman filter and the IMU electronics. This method reduces the complexity of the hardware design between the integrated navigation Kalman filter and the IMU electronics. However, the software complexity of the integrated system originates from the design of the integrated navigation Kalman filter. The current high-speed (more than 50 MHz) and modern mathcoprocessors allow this complexity to be overcome.

GPS and IMU Data Fusion

The navigation equation is given in the Earth-Centered Inertial (ECI) System. The orientation of the inertial coordinate axes is arbitrary. For inertial navigation purposes, the most convenient orientation coincides with the x, y, z conventional terrestrial reference system at the start of navigation. Let the symbols xe, ye, and ze denote the three ECI axes. At any time, after navigation begins, the ECI coordinates remain in a fixed orientation in inertial space while the origin moves with the Earth. The ze axis continues to be coincident with the Conventional Terrestrial Pole (CTP), but the xe axis is no longer parallel to the zero meridian plane because of the rotation of the Earth.

Theoretically, axes that are fixed to the Earth are not inertial axes, because of the various modes of motion that the Earth exhibits relative to the fixed space. The most important of these noninertial influences are (1) daily rotation of the Earth about its polar axis; (2) monthly rotation of the Earth-Moon system about its common mass or barycenter; (3) precession of the Earth's polar axis about a line fixed in space; (4) motion of the sun with respect to the galaxy; and (5) irregularities in the polar precession (or nutation). Even in the presence of these noninertial influences, the ECI is an important navigation coordinate system in that Newton's laws are approximately correct, and it is sufficient for vehicles navigating in the vicinity of the Earth.

Figure 12:
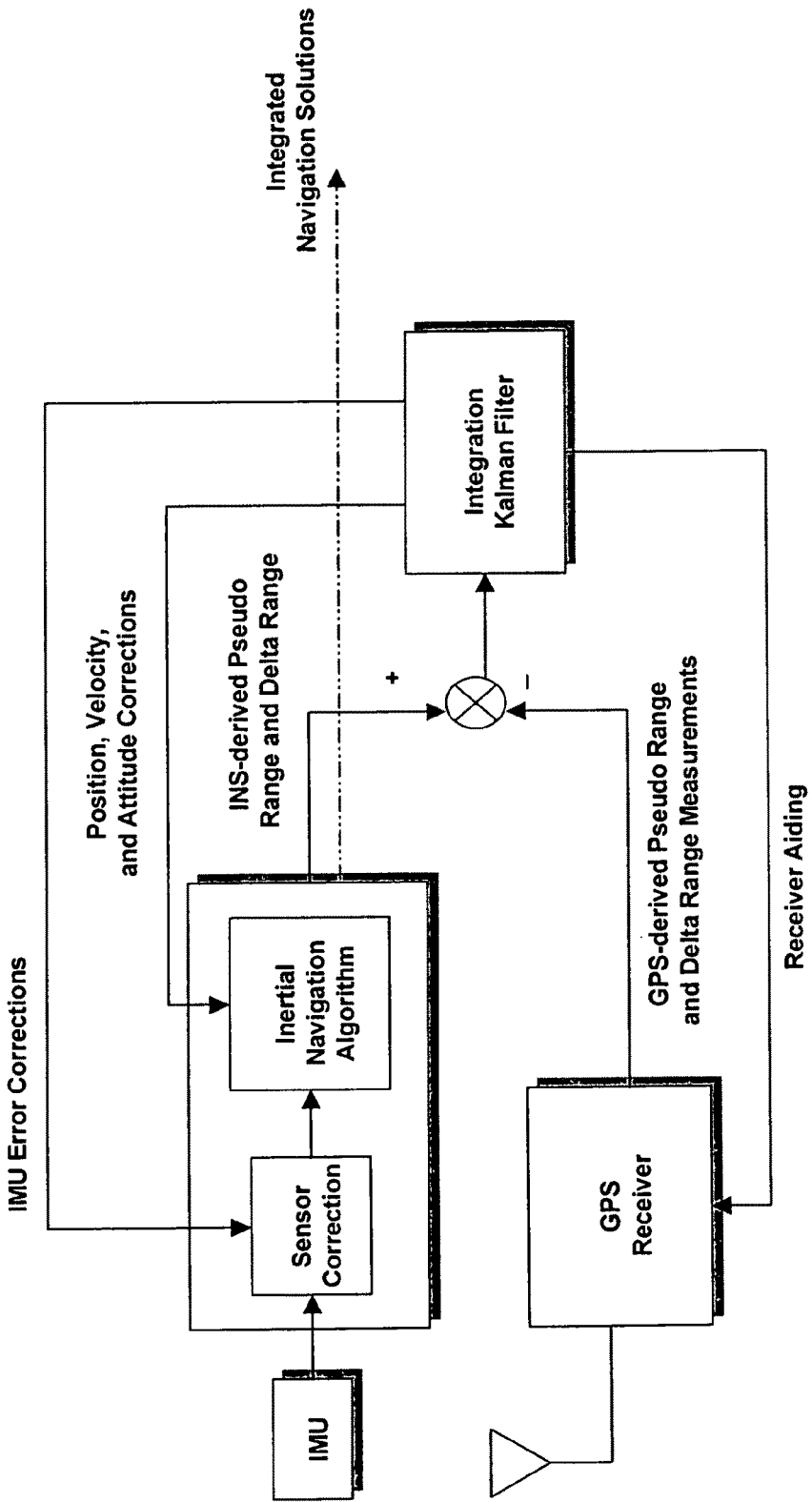
FIG. 12 is a block diagram of the AGNC's fully-coupled GPS/IMU process.

FIG. 12 gives the innovative approach applied in this invention for full integration of GPS raw data and the MEMS IMU raw data.

The GPS measurement equations in ECI are given by:

$$R_{G/A} = R_G(T_0) - R(T_0) - T_B^T R_{A/M} \quad (0.1)$$

$$y = \frac{1}{c}\left[|R_{G/A}| - \frac{1}{c}R_{G/A} \cdot R_G + \Delta\rho_{iono} + \Delta\rho_{eph}\right]$$

where
- $R$ = ECI position vector of the center of mass for the AERCam 1';
- $R_{A/M}$ = body-fixed coordinates of the AERCam 1' antenna with respect to the mass center;
- $T_B$ = transformation matrix from ECI to body-fixed coordinates;
- $R_A = R + T_B^T R_{A/M}$ = the ECI position vector of the AERCam 1' antenna;
- $R_G$ = ECI position vector of the GPS satellite;
- $\Delta\rho_{iono}$ = ionospheric refraction correction in meters;
- $\Delta\rho_{eph}$ = GPS ephemeris error along the line of sight from the AERCam 1';

Modeling of GPS Receiver

The primary tasks accomplished by a GPS receiver in the fully-coupled GPS/IMU integration unit are as follows:
- Identification of all visible satellites with calculation of geometric dilution of precision (GDOP);
- Measurement of satellite-to-receiver pseudoranges and decoding of the navigation message;
- Delivery of this data to the navigation microprocessor;
- Receiving of velocity and acceleration aiding data from the integration Kalman filter to perform external aiding, carrier phase, and code tracking.

In the fully-coupled integration Kalman filter where the pseudoranges are used as observables, the receiver clock drift and uncertainties are used as two elements of the system state vector. The receiver clock drift $\delta_t$ is represented by the integration of an exponentially correlated random process $x_t$:

$$\dot{x}_t = -ax_t + w_t$$

$$\delta_t = x_t \quad (0.2)$$

with $a=1/500$ and $w_t$ being Gaussian white noise with $\sigma_w = 10^{-12}$, to model a typical frequency drift rate of $10^{-9}$ s/s for a quartz TCXO.

The atmospheric delays are caused mainly by the propagation of the electromagnetic wave through the ionospheric and tropospheric layers. The atmospheric delays are represented by $$\Delta_{trop}(\theta) = 10^{-6}\left\{N_{d,0}^{tropo}\left(\sqrt{(R+h_d)^2 - R^2\cos^2\theta} - R\sin\theta\right) + N_{w,0}^{tropo}\left(\sqrt{(R+h_w)^2 - R^2\cos^2\theta} - R\sin\theta\right)\right\} \quad (0.3)$$

where R is the Earth's radius, $h_d$ and $h_w$ are the heights of the dry and wet tropospheric layers. The reflection indices are $$N_{d,0}^{tropo} = 77.64\frac{p}{T} \quad \text{and}$$

$$N_{w,0}^{tropo} = -12.96\frac{e}{T} + 3.718\times10^5\frac{e}{T^2}.$$

A Gaussian white noise with a standard deviation equal to 5% of $\Delta_{tropo}(\theta)$ is added to the pseudoranges to take uncertainties of the model into account.

Modeling of the INS

A complete picture of INS errors would involve a large number of states. Due to restrictions of the on-board computational resources, reduced order models have to be applied in practical designs. A simplified model capturing all critical features of an INS is described by the following differential equations:

$$\delta\dot{r}_N = -\dot{\lambda}\sin L\,\delta r_E + \dot{L}\,\delta r_D + \delta v_N \quad (0.4)$$

$$\delta\dot{r}_E = \dot{\lambda}\sin L\,\delta r_N + \dot{\lambda}\cos L\,\delta r_D + \delta v_E$$

$$\delta\dot{r}_D = -\dot{L}\,\delta r_N - \dot{\lambda}\cos L\,\delta r_E - c_1\delta r_D + \delta v_D$$

$$\delta\dot{v}_N = -\frac{f_D+g}{R}\delta r_N + \frac{f_E\tan L}{R}\delta r_E -$$
$$(2\Omega+\dot{\lambda})\sin L\,\delta v_E + \dot{L}\delta v_D - f_D\Phi_E + f_E\Phi_D + \Delta_N$$

$$\delta\dot{v}_E = -\frac{f_D+g+f_N\tan L}{R}\delta r_E + (2\Omega+\dot{\lambda})\sin L\,\delta v_N +$$
$$(2\Omega+\dot{\lambda})\cos L\,\delta v_E + f_D\Phi_N - f_N\Phi_D + \Delta_E$$

$$\delta\dot{v}_D = \frac{f_N}{R}\delta r_N + \frac{f_E}{R}\delta r_E + \left(\frac{2g}{R}-c_2\right)\delta r_D - \dot{L}\delta v_N -$$
$$(2\Omega+\dot{\lambda})\cos L\,\delta v_E - f_E\Phi_N + f_E\Phi_E + \Delta_D$$

$$\dot{\phi}_N = -\frac{\Omega\sin L}{R}\delta r_N + \left(\frac{v_D}{R^2}+\frac{\dot{L}\tan L}{R}\right)\delta r_E + \frac{\dot{\lambda}\cos L}{R}\delta r_D +$$
$$\frac{1}{R}\delta v_E - (\Omega+\dot{\lambda})\sin L\,\phi_E + \dot{L}\phi_D + \varepsilon_N$$

$$\dot{\phi}_E = -\frac{v_D}{R^2}\delta r_N + \frac{\dot{\lambda}\sin L}{R}\delta r_E - \frac{\dot{L}}{R}\delta v_D - \frac{1}{R}\delta r_N +$$
$$(\Omega+\dot{\lambda})\sin L\,\phi_N + (\Omega+\dot{\lambda})\cos L\,\phi_D + \varepsilon_E$$

$$\dot{\phi}_D = -\left(\frac{\Omega\cos L}{R}+\frac{\dot{\lambda}}{R\cos L}\right)\delta r_N + \frac{\tan L}{R}\left(\dot{L}\tan L+\frac{v_D}{R}\right)\delta r_E -$$
$$\frac{\dot{\lambda}\sin L}{R}\delta r_D - \frac{\tan L}{R}\delta v_E - \dot{L}\phi_N - (\Omega+\dot{\lambda})\cos L\,\phi_E + \varepsilon_D$$

where the subscripts N, E, D stand for the North-East-Down local level reference frame, $\delta r_N$, $\delta r_E$, $\delta r_D$ denote the INS position errors, $\delta v_N$, $\delta v_E$, $\delta v_D$ the INS velocity errors, $\Phi_N$, $\Phi_E$, $\Phi_D$ the INS attitude errors and azimuth error; $\lambda$ and L are the longitude and latitude angles; R is the radius of the earth and $\Omega$ is the earth's angular rate; f is the specific force measured by the accelerometers; and $c_1$ and $c_2$ are damping gain parameters introduced by the altimeter damping loop of the vertical channel. The input axes of the gyros and accelerometers are assumed to be aligned with the principal axes of the vehicle. $\Delta_N$, $\Delta_E$, $\Delta_D$ and $\varepsilon_N$, $\varepsilon_E$, $\varepsilon_D$ are the errors of the accelerometers and gyros mapped from the vehicle body frame into the navigation frame, respectively, using appropriate elements of the direction cosine matrix.

The gyro and accelerometer error models are given by:

$$\begin{pmatrix}\delta\omega_x\\\delta\omega_y\\\delta\omega_z\end{pmatrix} = \begin{bmatrix}S_x & M_{xy} & M_{xz}\\M_{yx} & S_y & M_{yz}\\M_{zx} & M_{zy} & S_z\end{bmatrix} \quad (0.5)$$

$$\bar{\omega}^b + \begin{bmatrix}G_{xx} & G_{xy} & G_{xz}\\G_{yx} & G_{yy} & G_{yz}\\G_{zx} & G_{zy} & G_{zz}\end{bmatrix}\bar{a}^b + \begin{bmatrix}G_x^2 a_x a_z\\G_y^2 a_y a_z\\G_z^2 a_z a_y\end{bmatrix} + \begin{bmatrix}\varepsilon_x\\\varepsilon_y\\\varepsilon_z\end{bmatrix} + \begin{bmatrix}n_x\\n_y\\n_z\end{bmatrix}$$

where $S_i$=scale factor errors; $M_{ij}$=misalignment errors; $G_{ij}$=g-sensitive drifts; $G_i^2$=$g^2$-sensitive drifts; $\epsilon_i$=gyro bias drifts; $n_i$=random walk errors.

$$\begin{pmatrix} \delta a_x \\ \delta a_y \\ \delta a_z \end{pmatrix} = \begin{bmatrix} K_x & L_{xy} & L_{xz} \\ L_{yx} & K_y & L_{yz} \\ L_{zx} & L_{zy} & K_z \end{bmatrix} \bar{a}^b + \begin{bmatrix} \Delta_x \\ \Delta_y \\ \Delta_z \end{bmatrix} \quad (0.6)$$

where $K_i$=scale factor errors; $L_{ij}$=misalignment erros; $\Delta_i$=accelerometer bias.

The navigation filter also includes descriptions of the dominant inertial instrument errors, i.e. gyro drift and accelerometer bias. Their estimates are used for sensor error compensation.

Integrated GNC

Figure 13:
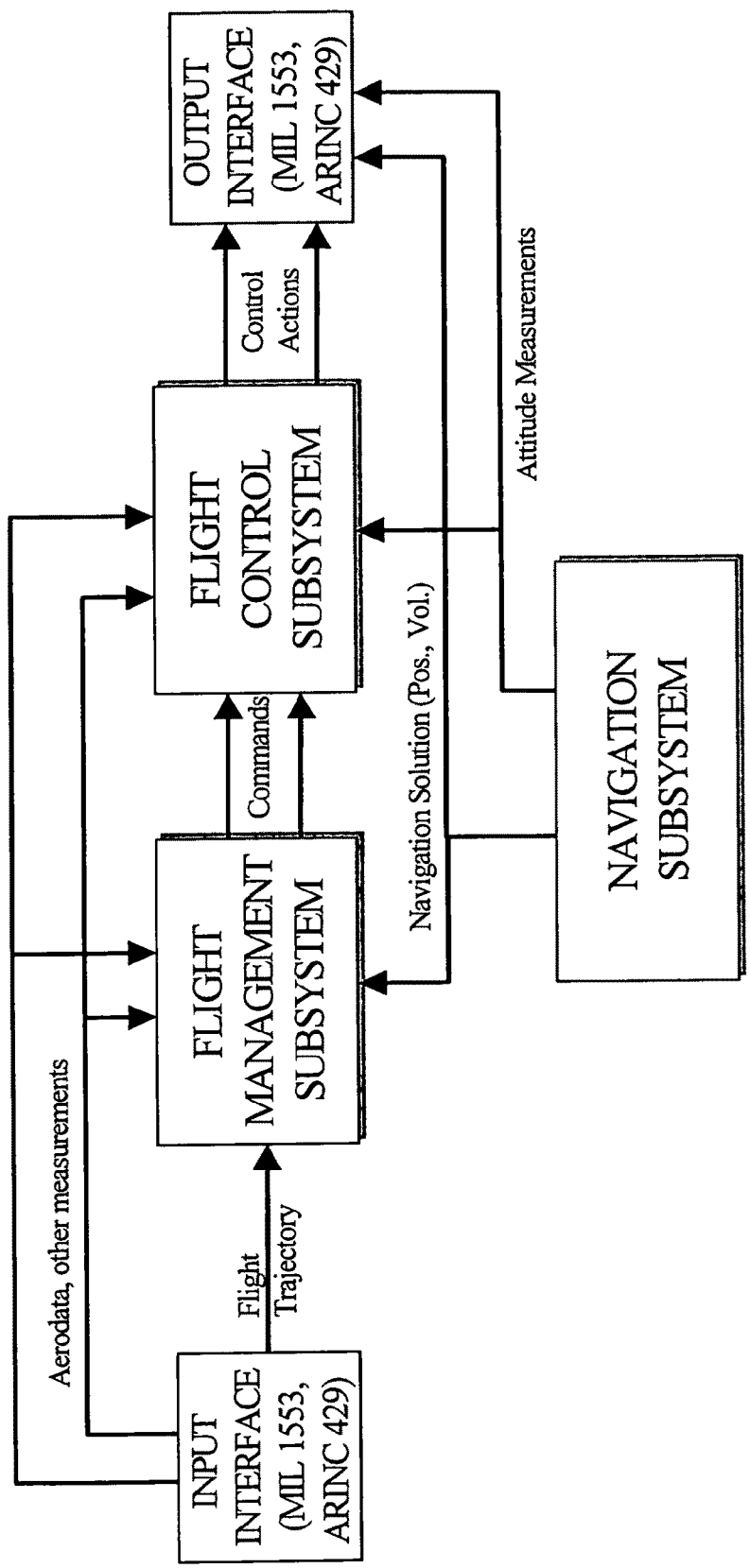
FIG. 13 is a functional block diagram of integrated flight control and navigation system.

FIG. 13 shows the functional block diagram of the integrated GNC for autonomous spacecraft. The system consists of three main subsystems:

Navigation subsystem. This subsystem provides accurate navigation solutions and attitude measurements for the flight management and flight control subsystems.

Flight management subsystem. This subsystem generates flight commands, such as attitude control commands and trajectory-tracking control commands, in terms of a desired flight trajectory, aerodata, attitude measurements, and navigation solutions.

Flight control subsystem. This subsystem performs high performance flight control.

The navigation subsystem utilizes AGNC's existing fully coupled GPS/IMU technology. The successful operational implementation of GPS provides state-of-the-art navigation capabilities through provision of extremely accurate three-dimensional position and time information. An integrated GPS/INS system provides even further benefits by exploiting the best attributes of both systems in a synergistic manner. Such an integrated navigation system will provide better reliability, smaller navigation errors, and improved survivability. Specifically, the INS can help GPS by providing accurate initial estimates on position and velocity, thus reducing the time required for the GPS receiver to lock onto the signals streaming down from the satellites. If one or more of the satellite signals is subsequently lost due to receiver malfunction, terrestrial blockages, wing shielding, or low signal/noise ratio, the inertial navigation system can help achieve reacquisition quickly and efficiently. The continuous velocity measurements obtained from the inertial system allow the GPS receiver to estimate the magnitude of the current Doppler shift so that it can narrow the bandwidth of its tracking loops. This improves the dynamic operation of the integrated navigation system and also increases its jamming immunity. On the other hand, the GPS receiver can help the inertial navigation system with accurate, real-time estimates on the current behavior of its error statistics. This helps to provide a more stable and accurate navigation solution. Absolute geolocation, attitude, and precise relative navigation are critical capabilities for autonomous vehicles. Integrated GPS/INS navigation systems will provide the most promising navigation device for such systems.

Flight navigation and control is a multiple objective optimization problem. The control is required to achieve a high level of precision, robustness, and reliability to improve mission effectiveness and completion probability. Furthermore, time varying and nonlinear dynamics may be at issue. Advanced techniques have made significant progress in the areas of robust control, nonlinear control, and intelligent control. These techniques provide an opportunity for the design of high-performance spacecraft flight control systems. Specifically, a control integration scheme of nonlinear control, robust control, fuzzy logic control, and neural network control will be investigated and developed to address specific issues, such as nonlinearities, uncertainties, and component failures, arising during the flight control of spacecraft. The objective is to improve performance robustness and reliability for all flight conditions. The nonlinear control loop is employed to approximately linearize and decouple the input-output dynamics of the system, to compensate for nonlinear effects, and to achieve the design requirements for nominal operation. The robust control loop design is based upon the linearized and decoupled system dynamics to guarantee performance in the presence of uncertainties and to provide robust stability. Finally, the intelligent adaptive control loop is employed to provide adaptivity and intelligence and to fine-tune control performance. This optimal combination scheme exploits and integrates the merits of nonlinear, robust, intelligent, and adaptive control and is expected to greatly enhance spacecraft performance.

In summary, the integrated GNC system has the following features:

High-speed data processing. The high-speed data processing capability is necessary for handling complicated real-time flight navigation, management, and control tasks. The integrated flight control and navigation system employs advanced microprocessor and parallel processing techniques to perform flight data processing at a high sampling rate.

Highly accurate navigation and attitude measurements. In order to successfully perform a spacecraft flight mission, highly accurate navigation is essential. The flight control and navigation system employs AGNC's existing fully coupled GPS/IMU navigation technology. Additionally, the GPS measurements will aid the IMU attitude determination, and will provide continuous and highly-accurate attitude measurements.

Robustness, adaptivity and reconfigurability. Automatic spacecraft flight control is a very challenging problem due to large aerodynamic coefficient variations within a large altitude range. The flight control system must have robust, adaptive, and reconfigurable control capabilities. The flight control system employs advanced control techniques to achieve these capabilities. It is robust against and adaptive to changing flight conditions.

Networking and serial communication capability. The integrated flight control and navigation system provides a networking port to connect with other computer systems, and serial MIL 1553, ARINC 429, RS232 and/or RS422 ports to connect with peripheral devices. The networking capability allows one to connect the flight control and navigation system to a host computer, which may be used to upload data from and download program and/or data to the system, as well as debug and monitor the performance of the flight control and navigation system. By connecting to other measurement instruments onboard through serial ports, the system can use data from and send messages to these instruments.

Low cost, lightweight and small size. Low cost, low power, lightweight and small size are vitally important factors in the development of commercial vehicle control and navigation systems. The integrated flight control and navigation system utilizes the latest proven hardware and software techniques, such as microelectromechanical (MEM), multi-layered integrated circuits, and windows and object-oriented programming techniques, to reduce the physical size, weight, and manufacturing cost and enhance the maintainability and reliability.

Figure 14:
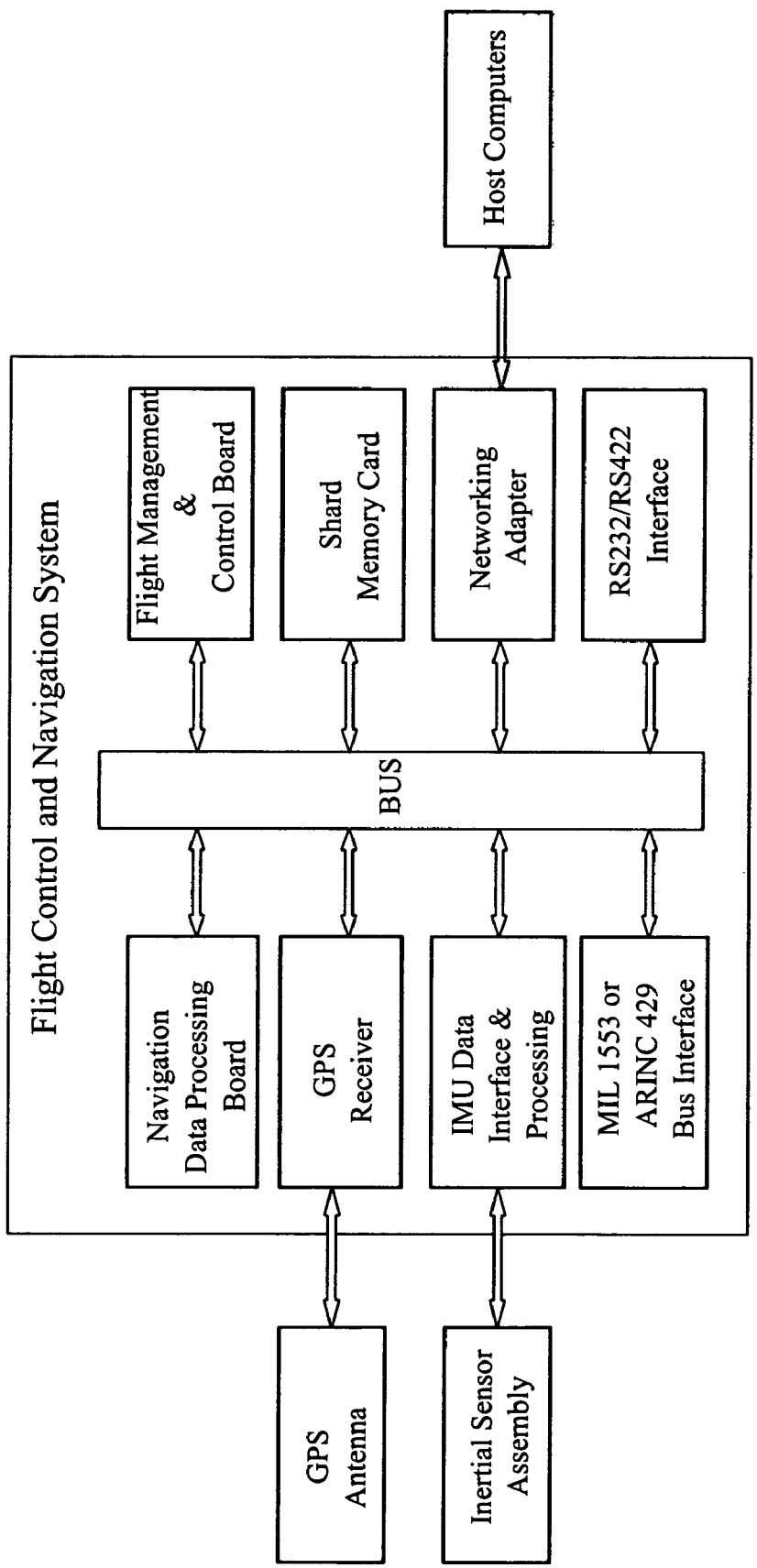
FIG. 14 is a block diagram of the modular structure of integrated flight control and navigation system.

The integrated GNC hardware system was designed based on a standard 32-bus structure, and in a modular way. FIG. 14 shows the modular structure of the integrated flight control and navigation system. The basic modules include:

Navigation data processing module,
Flight management and control module,
GPS receiver module,
IMU data interface and processing module,
Shared memory module,
Networking adapter module,
MIL 1553 or ARINC 429 interface module, and
RS 232/RS 422 interface module.

GPS Multipath Noise Mitigation Algorithms

This section documents the results of the investigation into the charateristics of the GPS multipath noise and the multipath signal mitigation algorithms.

Figure 15:
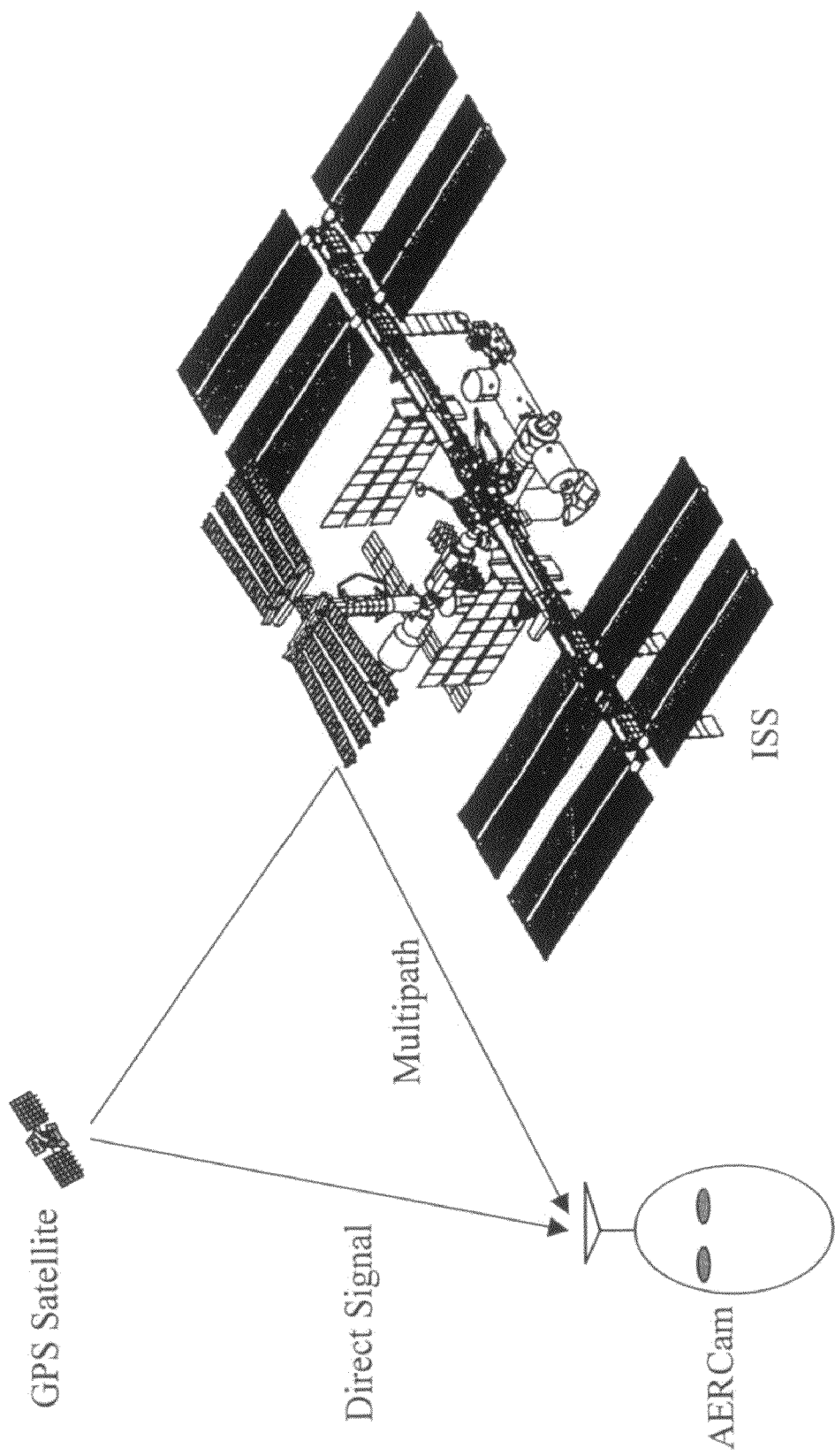
FIG. 15 is a schematic diagram illustrating the multipath introduced by the ISS 2'.

The GPS multipath effect is well described by its name that a GPS satellite signal arrives at the GPS receiver antenna via more than one path. Multipath is mainly caused by reflecting surfaces near the GPS receiver antenna. The International Space Station (ISS 2') is very large in terms of physical and electrical size. Its mechanical structure is also complex which forms many potential reflecting surfaces for the GPS satellite signals, as shown in FIG. 15.

Figure 16:
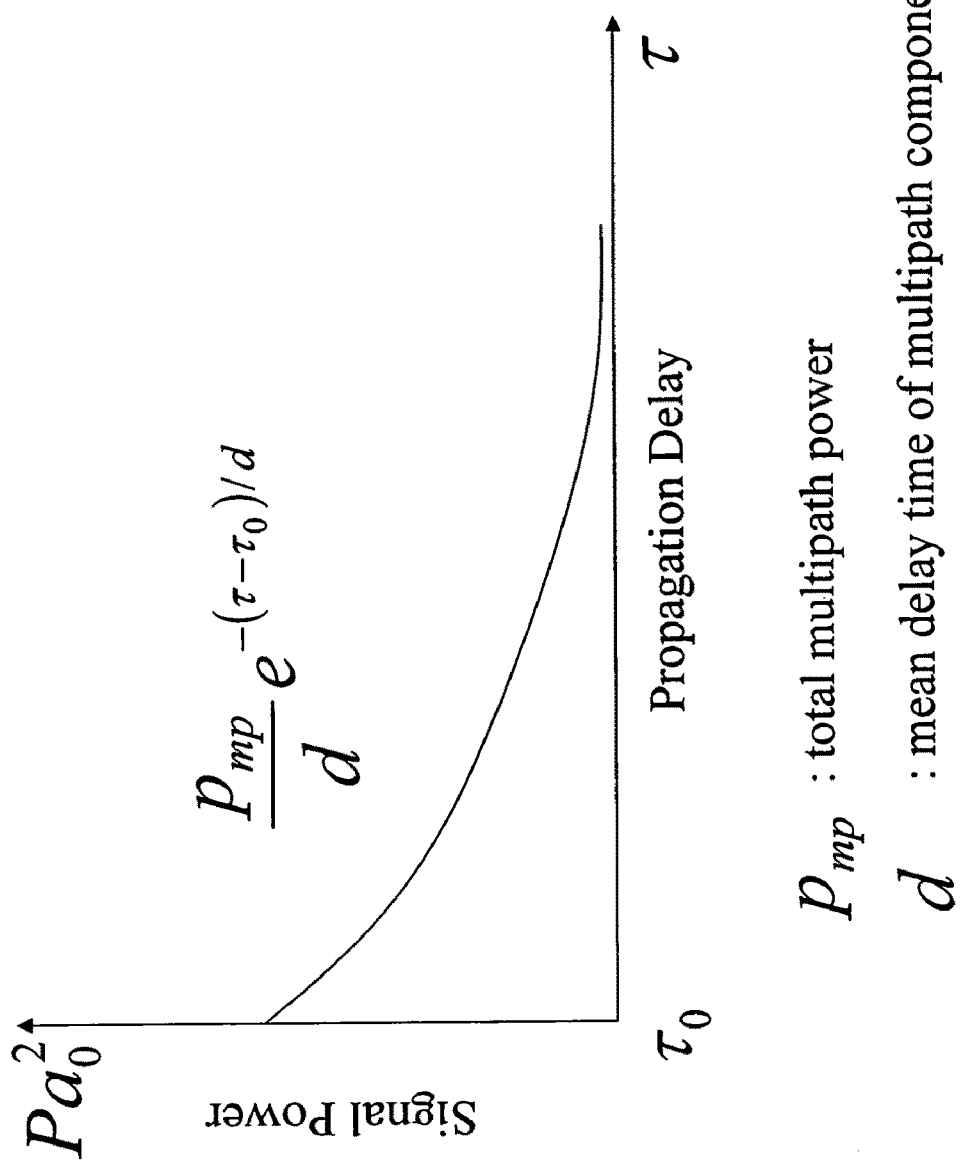
FIG. 16 is a graph of the multipath signal propagation delay.

Multipath is the corruption of the direct GPS signal by one or more signals reflected from local surroundings. FIG. 16 gives the time delay errors introduced by the multipath signals. Carrier phase multipath is currently the limiting error source for high precision GPS applications such as carrier phase relative navigation and carrier phase attitude determination.

As a consequence, the received signals have relative phase offsets and the phase differences are proportional to the differences of the path lengths. There is no general model of the multipath effect because of the arbitrarily different geometric situations. However, for a certain ISS 2' configuration, the GPS multipath effect shows some kind of pattern. In this case the modeling and computational methods can be applied to predict and evaluate the multipath effects. For example, Lockheed Martin Space Mission Systems and Services Company conducted a study of the computation of signal strength and phase errors due to multipath effects using a rigorous Computational Electromagnetics (CEM) technique called the Uniform Geometrical Theory of Diffraction (UTD). The UTD technique provides a high frequency approximate solution to the electromagnetic fields—including incident, reflected, and diffracted fields as well as their interactions. In the field computation using UTD, the incident, reflected, and diffracted fields are determined by the field incident on the reflection or diffraction point multiplied by a dyadic reflection or diffraction coefficient, a spreading factor, and a phase term.

The model and computational methods are not suitable for conditions where the reflection points and the number of reflection surfaces are changing. The GPS multipath is a very complex issue which upsets accurate navigation because not only the mechanical structures on the ISS 2' are in motion, such as the solar panels, but the GPS satellites and the AERCam 1' are moving. Therefore, the computational method such as the UTD only provides an approach to evaluate the accuracy dilution of navigation arising from the multipath signals.

The influence of the multipath can also be estimated by using a simple method of combination of L1 and L2 code and carrier phase measurements. The principle is based on the fact that the troposphere, clock errors, and relativistic effects influence code and carrier phases by the same amount. This is not true for ionospheric refraction and multipath which are frequency dependent. Taking ionospheric-free code ranges and carrier phases, and forming corresponding differences, all afore-mentioned effects except for multipath cancel out. The residual, apart from the noise level, is the multipath effect.

The elimination of multipath signals is also possible by selecting an antenna that takes advantage of the signal polarization. GPS signals are right-handed circularly polarized whereas the reflected signals are left-handed polarized. A reduction of the multipath effect may also be achieved by digital filtering, wideband antennas, and radio frequency absorbent antenna ground planes. The absorbent antenna ground plane reduces the interference of satellite signals with low or even negative elevation angles which occur in case of multipath.

Figure 17:
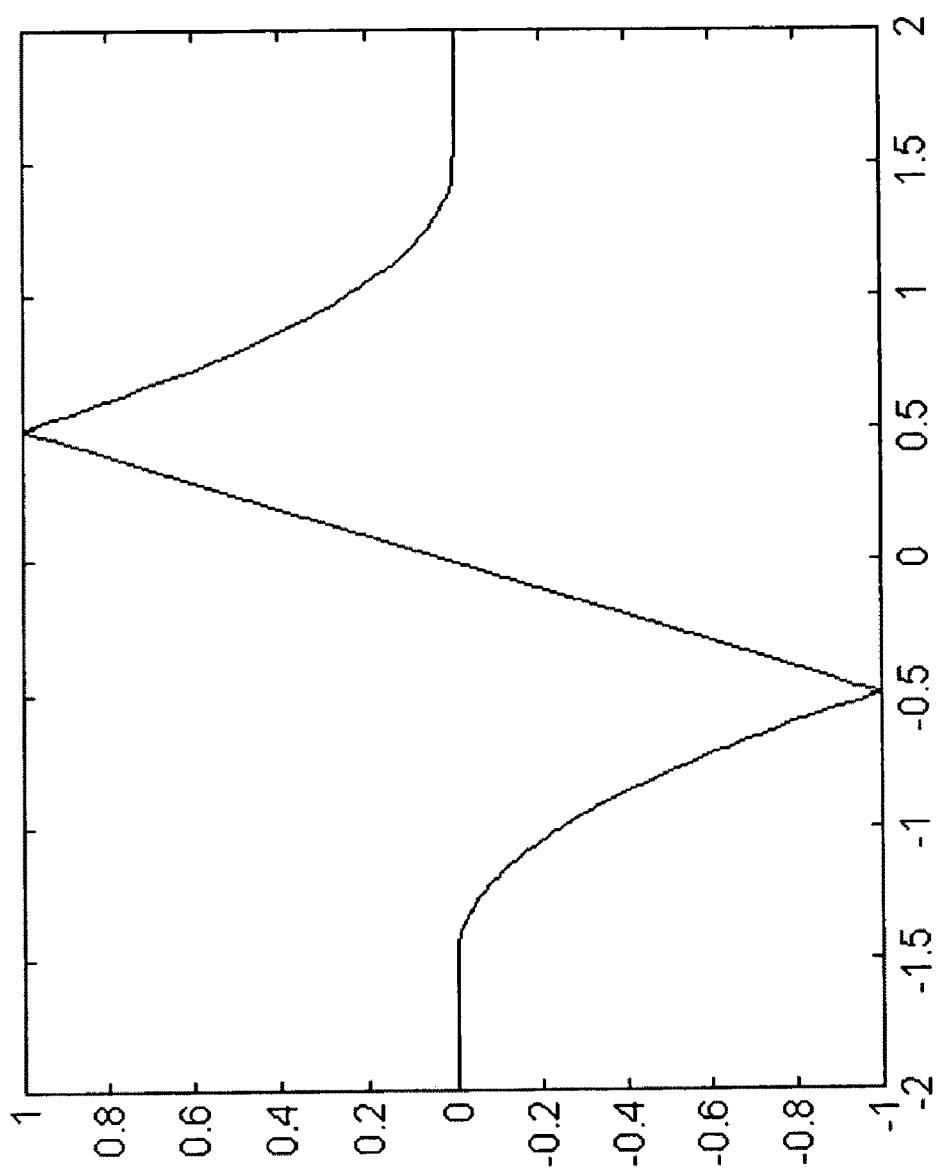
FIG. 17 is a graph of non-coherent delay-locked (NCDLL) loop s-curve.

The Phase-Lock Loop (PLL) for carrier tracking and Delay-Locked Loop (DLP) for code tracking can be modified for multipath mitigation in a GPS receiver. The characteristics of the phase detector in the PLL and the discriminator in the DLL dominate the tracking performance of the PLL and DLL. FIG. 17 shows the discriminator in a GPS receiver. Note that there is a linear region around $\delta=0$. This region is always chosen as the operating region of the DLL, and the loop will tend to operate at the point where $S(\delta)=0$ and the slope is positive. The multipath effects contaminate the linear characteristics of the S-curve. The multipath forces the equilibrium point to move, causing false tracking of the received signal.

A bank of correlators are used to estimate the gain and the phase of the direct-path and reflected multipath signals. These parameters are then fed back into the standard non-coherent DLL to force the false equilibruim point due to the multipath to be shifted into the true point. This process is achieved in the discriminator by weighting the output of the correlators with the estimated multipath parameters such that the mathematical summation of the correlator outputs is zero as long as the tracking error is zero.

Figure 18:
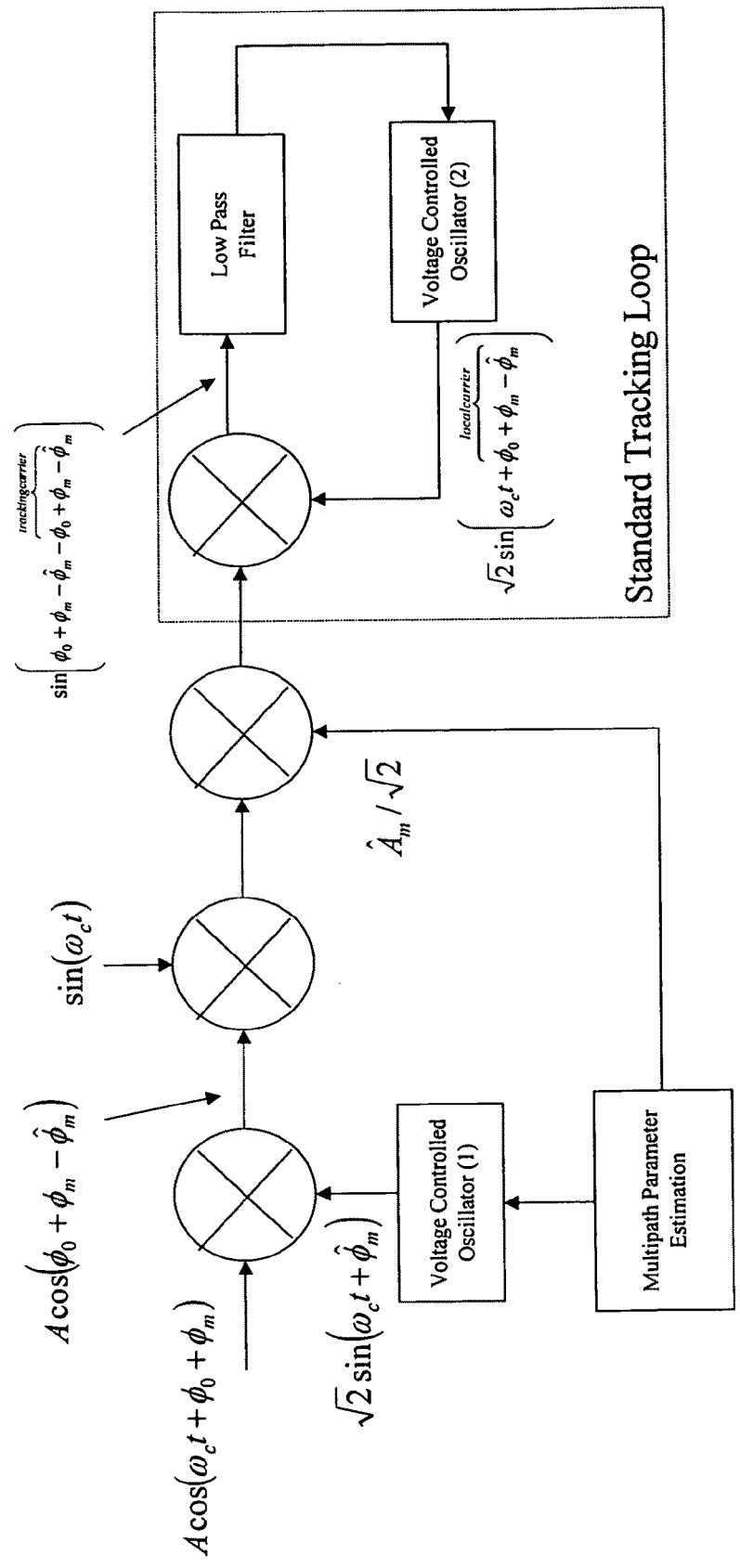
FIG. 18 is a diagram of phase-lock loop with multipath mitigation.

The two multipath parameters influencing the S-curve are the time delay a and the strength parameter A. The strength parameter A affects the power added to the direct path signal. FIG. 18 gives the modified PLL for multipath mitigation. Assume that the GPS signal with multipath is given by $$P = A \cos(\omega_c t + \Phi_0 + \Phi_m) \quad (0.1)$$

The Voltage Controlled Oscillator (VCO) 1 generates a sine wave $\sin(\omega_c t + \hat{\Phi}_m)$, whose input is the calculated phase $\hat{\Phi}_m$ from the estimated multipath parameters. The first multiplier outputs $A \cos(\Phi_0 + \Phi_m - \hat{\Phi}_m)$. The second multiplier modulates this signal to the carrier frequency $\omega_c$, yielding $A \cos(\omega_c t + \Phi_0 + \Phi_m - \hat{\Phi}_m)$.

The next step is to mitigate the effect of the multipath strength by multiplying the cosine signal by the estimated multipath amplitude, $\hat{A}_m/\sqrt{2}$. The actual signal into the standard PLL becomes $\hat{A}_m \cos(\omega_c t + \Phi_0 + \Phi_m - \hat{\Phi}_m)$, and the local generated carrier phase is $$\sqrt{2} \sin\left(\omega_c t + \phi_0 + \phi_m + \hat{\phi}_m \overset{localcarrier}{}\right) \quad (0.2)$$

where $\Phi_0 + \Phi_m - \hat{\Phi}_m$ is the phase estimated by the PLL. This shows that the carrier phase tracking accuracy is dependent upon the estimation of the multipath carrier. The corresponding tracking curve is given by $$\sin\left(\phi_0 + \phi_m - \hat{\phi}_m - \overline{\phi_0 + \phi_m - \hat{\phi}_m}^{\text{trackingcarrier}}\right) \quad (0.3)$$

When steady state tracking of the PLL is reached and an exact estimate of multipath error carrier phase is available, the complete alignment of the direct path signal with the local carrier signal is achieved.

Laser Dynamic Range Imager Alignment

The implication of using the Laser Dynamic Range Imager (LDRI) for the alignment of the AERCam 1' navigation system is to obtain the range, range rate measurements and orientation of the AERCam 1' when it is in the field of view of the LDRI. These range, range rate measurements and orientation data are employed together with the geometry data of the laser source to compare with the navigation solution and periodically align the AERCam 1''s navigation system.

The laser dynamic range imager (LDRI) is an area range-sensing instrument to obtain dynamic range measurements of vibrating structures on the ISS 2'. Diffuse laser light is used as an illumination source and its reflections are intensified and sensed by a video camera. The video images and phase shift information are post-processed to obtain range data on a pixel-by-pixel basis from a target in the field of view.

The LDRI alignment procedure can be done whenever AERCam 1' is in the field of view of the LDRI. Another scenario is to periodically send the AERCam 1' to the field of view of the LDRI to perform the alignment. The second method is an active approach to assure the AERCam 1' navigation accuracy.

Range, Range Rate and Attitude Determination Using LDRI

The position, velocity and attitude of the AERCam 1' can be determined by the LDRI which is the misalignment information source. The alignment is done by estimating misalignment between the LDRI measured position, velocity and attitude of the AERCam 1' and position, velocity and attitude derived by the INS navigation system onboard the AERCam 1' through dynamic data matching.

Figure 19:
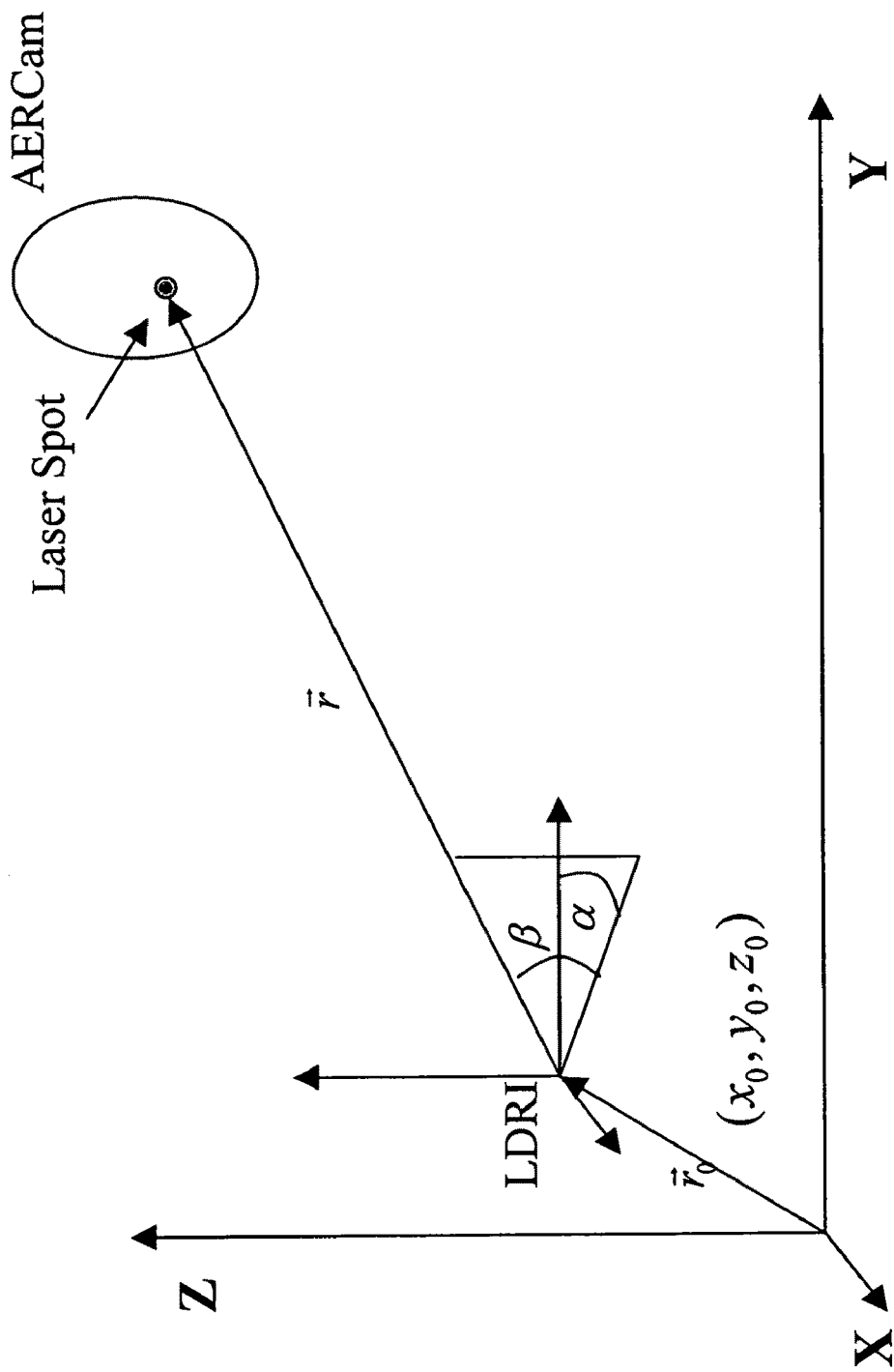
FIG. 19 illustrates the geometrical configuration of the LDRI and the AERCom: the LDRI is installed on the ISS 2' which is located in the ISS 2' coordinate frame.

The geometrical configuration of the LDRI and the AERCam 1' is given in FIG. 19. The line-of-sight (LOS) related to a specific laser spot on the AERCam 1' can be easily determined through calculation of the elevation angle β and azimuth angle α as follows:

$$\beta = arctg(Y/\sqrt{X^2 + F^2})$$

$$\alpha = arctg(X/F) \quad (0.1)$$

where (X,Y) are the coordinates of the laser spot in the X-Y plane of the 3-D image taken by the LDRI and F is the focal length of the LDRI.

The LDRI also detects precisely the range related to a point on the AERCam 1', which corresponds to the third dimension of the 3-D image of the AERCam 1'. The coordinates of a point on the AERCam 1' thus can be determined using the range measurement and the LOS angles given in Equation 6.1. The attitude of the AERCam 1' can be derived from the range profile image taken by the LDRI.

Optimal LDRI Alignment Filter

The physical misalignment between the ISS 2' frame $F_{ISS\ 2'}$ axes and the AERCam 1' frame $F_{AERCam\ 1'}$ axes can be characterized by a small angle expressed either in the $F_{ISS\ 2'}$ frame, denoted by $\psi^{[ISS]}$ or in the $F_{AERCam\ 1'}$ frame, denoted by $\psi^{[AERCam]}$. In the LDRI alignment, the ISS 2' orientation relative to the navigation frame $F_n$ is assumed to be known and used as a reference. Even under the condition of perfect alignment, the computed orientation of the AERCam 1' (onboard IMU) differs from the actual orientation due to various errors in measurements and computations. Given the transformation matrices from the ISS 2' frame $F_{ISS\ 2'}$ and the AERCam 1' frame $F_{AERCam\ 1'}$ to the navigation frame $F_n$ and $C_{nISS\ 2'}$ and $C_{nAERCam\ 1'}$, respectively, the misalignment from $F_{AERCam\ 1'}$ to $F_{ISS\ 2'}$ is $$C_{ISS/AERCam} = C_{ISSn} C_{nAERCam} \quad (0.2)$$

$$= \begin{bmatrix} 1 & -\psi_z^{[AERCam]} & \psi_y^{[AERCam]} \\ \psi_z^{[AERCam]} & 1 & -\psi_x^{[AERCam]} \\ -\psi_y^{[AERCam]} & \psi_x^{[AERCam]} & 1 \end{bmatrix}$$

$$= I + [\psi^{[AERCam]} \times]$$

It can be seen that, when $\psi^{[AERCam]} = 0$ in Equation (6.2), the two frames are perfectly aligned.

In transfer alignment, the ISS 2' orientation relative to the navigation frame is assumed to be known and used as a reference. The orientation of the AERCam 1' IMU relative to the navigation frame is computed using the attitude update equation shown in Equation (6.3) from an initial orientation and the gyros' outputs. The evolution of the attitude of the body-fixed frame $F_b$ relative to the navigation frame $F_n$ can be expressed as $$\frac{d}{dt}(C_{nb}) = C_{nb}[\omega_{b/n}^{[b]} \times] \quad (0.3)$$

where
$C_{nb}$ = transformation matrix from body frame $F_b$ navigation frame $F_n$
$\omega_{b/n}^{[b]}$ = rotation rate of body frame $F_b$ relative to navigation frame $F_n$ referenced in $F_b$
x = vector cross product.

The vector cross product in Equation (6.3) can be represented in the form of skew symmetric matrix $$[\omega_{b/n}^{[b]}] = \begin{bmatrix} 0 & -\omega_z & \omega_y \\ \omega_z & 0 & -\omega_x \\ -\omega_y & \omega_x & 0 \end{bmatrix} \quad (0.4)$$

where $\omega_{b/n}^{[b]} = [\omega_x, \omega_y, \omega_z]^T$ The transformation matrix $C_{nb}$ in Equation (6.3) can be parameterized in three alternative ways:
with 9 elements as the direction cosine matrix;
with 4 elements as a rotation quaternion;
or with 3 Euler angles.

The AERCam 1' IMU transformation matrix is initialized using that of the ISS 2' IMU. That is, at time t=0, $$C_{AERCam*n}(0)C_{ISS/AERCamn}(0) = C_{AERCam*ISS}(0) = I \quad (0.5)$$

After the initial time, $$C_{AERCam*n}(t)C_{ISSn}(t) = C_{AERCam*m}(t) =$$
$$I - [\psi_c^{[AERCam]}(t) \times], \psi_c^{[AERCam]} = 0 \quad (0.6)$$

where $\psi_c^{[AERCam]}$ denotes the small angle by which the computed frame $F_{AERCam\ 1'*}$ will drift away from $F_{ISS\ 2'}$. This drift is attributed to the effect of the physical misalignment $\psi_c^{[AERCam]}$, sensor noise, and others. Note that this attitude difference $\psi_c^{[AERCam]}$ is measurable and can be obtained by $$[\psi_c^{[AERCam]}(t) \times] = I - C_{s*n}(t) C_{mn}(t) \tag{0.7}$$

where $C_{s*n}$ and $C_{nm}$ are provided by the attitude computation of the ISS 2' IMU or navigation system and the AERCam 1' IMU, respectively.

The evolution of the attitude difference between the computed IMU frame $F_{AERCam\ 1'*}$ and the master frame $F_{ISS\ 2'}$ is obtained by differentiating Equation (6.7) as $$[\dot\psi_c^{[AERCam]}(t) \times] = -\dot L_{AERCam*n} C_{nISS} - C_{AERCam*n} \dot L_{nISS} \tag{0.8}$$

Bringing into Equation (6.8) the rates of transformation matrices as given in Equation (6.3) neglecting products of small angles, gyro drift rates, and flexible body rates leads to the following equation $$[\dot\psi_c^{[AERCam]}(t) \times] = [\hat\omega_{AERCam/n}^{[ARCam]} \times] - [\hat\omega_{AERCam/n}^{[AERCam]} \times \psi_c \times] - [\omega_{ISS/n}^{[AERCam]} \times] + [\psi_c \times \omega_{ISS/n}^{[AERCam]} \times] - [(\psi_c \times \omega_{ISS/n}^{[ISS]}) \times] \tag{0.9}$$

where $\hat\omega_{AERCam/n}^{[AERCam]}$ is the computed angular rate of $F_{AERCam\ 1'}$ relative to $F_n$ referenced in $F_{AERCam\ 1'*}$.

The computed AERCam 1' IMU rotation rate $\hat\omega_{AERCam/n}^{[AERCam]}$ can be written as $$\hat\omega_{AERCam/n}^{[AERCam]} = \hat\omega_{AERCam/i}^{[AERCam]} - \omega_{n/i}^{[AERCam]} = \omega_{AERCam/i}^{[AERCam]} + \varepsilon_g^{[AERCam]} - \omega_{n/i}^{[AERCam]} = \omega_{AERCam/n}^{[AERCam]} + \varepsilon_g^{[AERCam]} \tag{0.10}$$

where $\omega_{AERCam/i}^{[AERCam]}$ is the actual rotation rate in the input axes of the gyros and $\varepsilon_g^{[AERCam]}$ the AERCam 1' gyro errors resulting from instrument imperfections.

Bringing the expression for $\hat\omega_{AERCam/n}^{[AERCam]}$ into Equation (6.8), neglecting products of small angles and gyro drift rates yields $$[\dot\psi_c^{AERCam} \times] = [\varepsilon_g^{[AERCam]} \times] + [(\psi_c^{[AERCam]} \times \omega_{AERCam/n}^{[AERCam]}) \times] - [(\psi^{[AERCam]} \times \hat\omega_{AERCam/n}^{[AERCam]}) \times] \tag{0.11}$$

or $$\dot\psi_c^{[AERCam]} = \psi_c^{[AERCam]} \times \hat\omega_{AERCam/n}^{[AERCam]} + \varepsilon_g^{[AERCam]}, \psi_c^{[AERCam]}(0) = 0 \tag{0.12}$$

From the above equation we can see that the AERCam 1' frame is driven by the gyro instrument errors $\varepsilon_g^{[AERCam]}$ to drift away from an initial orientation under the assumptions of no physical misalignment and zero initial misalignment.

There is also a discrepancy between the LDRI derived AERCam 1' velocity and the velocity sensed by the accelerometers. This information can also be used for the correction of the AERCam 1' navigation system.

The navigation solution provided by the ISS 2' IMU is $$\frac{d}{dt} v_{ISS}^{[n]} = C_{nISS} a_{ISS}^{[ISS]} + g_{ISS}^{[n]} - (\omega_{n/i}^{[n]} + \omega_{e/i}^{[n]}) \times v_{ISS}^{[n]} - \omega_{e/i}^{[n]} \times \omega_{e/i}^{[n]} \times R^{[n]} \tag{0.13}$$

where
$v_{ISS}^{[n]}$=earth-centered velocity in the navigation frame provided by the ISS 2' IMU $a_{ISS}^{[ISS]}$=platform acceleration in the ISS 2' IMU frame
$g_{ISS}^{[n]}$=gravity vector in the navigation frame Similarly, the navigation solution provided by the AERCam 1' IMU is $$\frac{d}{dt} v_{AERCam}^{[n]} = C_{nAERCam} * \hat a_{AERCam}^{[AERCam]} + g_{AERCam}^{[n]} - (\omega_{n/i}^{[n]} + \omega_{e/i}^{[n]}) \times v_{AERCam}^{[n]} - \omega_{e/i}^{[n]} \times \omega_{e/i}^{[n]} \times R^{[n]} \tag{0.14}$$

where
$v_{AERCam}^{[n]}$=earth-centered velocity in the navigation frame provided by the slave IMU
$\hat a_{AERCam}^{[AERCam]}$=measured acceleration in the AERCam 1' IMU frame
$g_{AERCam}^{[n]}$=gravity vector in the navigation frame estimated by the slave IMU From Equations (6.13) and (6.14), the AERCam 1'-minus-ISS 2' velocity difference is propagated according to $$\frac{d}{dt}(v_{AERCam}^{[n]} - v_{ISS}^{[n]}) = C_{nAERCam} * \hat a_{AERCam}^{[AERCam]} - C_{nISS} * \hat a_{ISS}^{[ISS]} - (\omega_{n/i}^{[n]} + \omega_{e/i}^{[n]}) \times (v_{AERCam}^{[n]} - v_{ISS}^{[n]}) \tag{0.15}$$

where an identical gravitational compensation for the ISS 2' and AERCam 1' systems is assumed so that the ISS 2' and AERCam 1' gravitational effects cancel perfectly.

The AERCam 1'-sensed acceleration is given by $$\hat a_{AERCam}^{[AERCam]} = a_{AERCam}^{[AERCam]} + \varepsilon_a^{[AERCam]} \tag{0.16}$$

where $a_{AERCam}^{[AERCam]}$ is the actual acceleration in the input axes of the accelerometers and $\varepsilon_a^{[AERCam]}$ is the AERCam 1' accelerometer errors due to instrument imperfections.

Finally, the velocity error equation is given by:

$$\frac{d}{dt} \Delta u^{[n]} = C_{n/AERCam} \psi_c^{[AERCam]} \times \hat a_{AERCam}^{[AERCam]} + C_{n/AERCam} \varepsilon_a^{[AERCam]} \tag{0.17}$$

The system model of the optimal LDRI alignment filter is given in Table 0.1.
Table 0.1 System Model The state vector for the complete system is chosen as follows (the definitions are also given in Error! Reference source not found.). There are six states characterizing the velocity and attitude errors, i.e., three for $\Delta u$ and three for $\psi_c$, respectively. The choice of states for inertial sensors depends on whether the sensor dynamic characteristics and error parameters are included or not.

The use of sensor error parameters as states provides a way to calibrate the sensors through Kalman filtering. The number of states required to model inertial sensor errors varies considerably and depends on the sensor quality and accuracy requirement. A generic sensor model is used in the current formulation such that it can fit a large range of applications and serve multiple purposes. There are twelve states for gyros (three for bias, three for scale factors, and six for sensor linear alignment errors) and twelve states for accelerometers (three for bias, three for scale factors, three for sensor axes nonorthogonalities, and three states for acceleration-squared nonlinearities along and across the input axis).

The optimal Kalman filter is given in Error! Reference source not found.

Stereo Camera Range Algorithm

Figure 20:
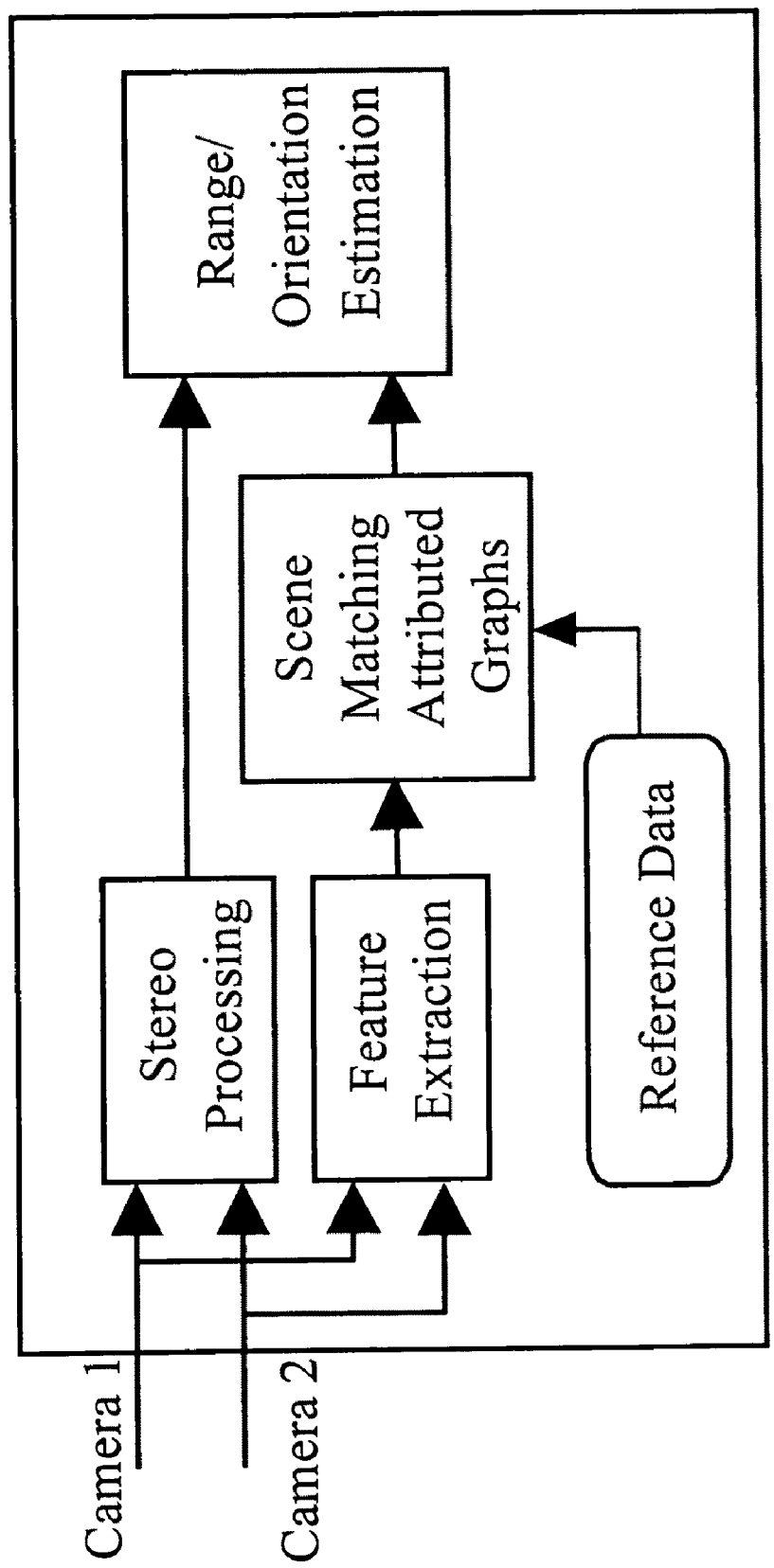
FIG. 20 is a flow diagram of image processing subsystem.

The stereo images generated by the dual cameras 71 installed on board the AERCam 1' are used to estimate the range and the orientation of the ISS 2' relative to the AERCam 1'. FIG. 20 shows the functional flow of this image processing subsystem.

Denote the images obtained synchronously from the two cameras 71 as $E_1(x,y)$ and $E_2(x,y)$. $E_1(x,y)$ and $E_2(x,y)$ represent the same physical scene from different viewing angles. A correlation operation between these two images is taken to find point correspondences of two stereo images, and further to fix the intercept angle α. The intercept angle α is defined as the angle between the boresight from camera 1 to the object and the boresight from camera 2 to the object. This correlation-based algorithm is given by:

$$A(\phi) = E_1(x,y) \otimes [R(\phi)E_2(x,y)], \phi \in [,\pi] \quad (0.1)$$

where $R(\phi)$ is the rotation transformation implemented to the image $E_2(x,y)$, and $\phi$ is the rotation angle. The cross-correlation function given by the above equation is a function of the rotation angle $\phi$. The discrimination rule for the intercept angle α determination is given by $$\alpha = \max_{\varphi \in [0,\pi)} [A(\varphi)] \quad (0.2)$$

In other words, α is this angle $\phi$ that maximizes $A(\phi)$ over the given range of $\phi$. Once the intercept angle α is fixed, the range from the sensor to the object can be derived according to the prior geometric knowledge of the separation distance between the two video cameras 71.

Figure 21:
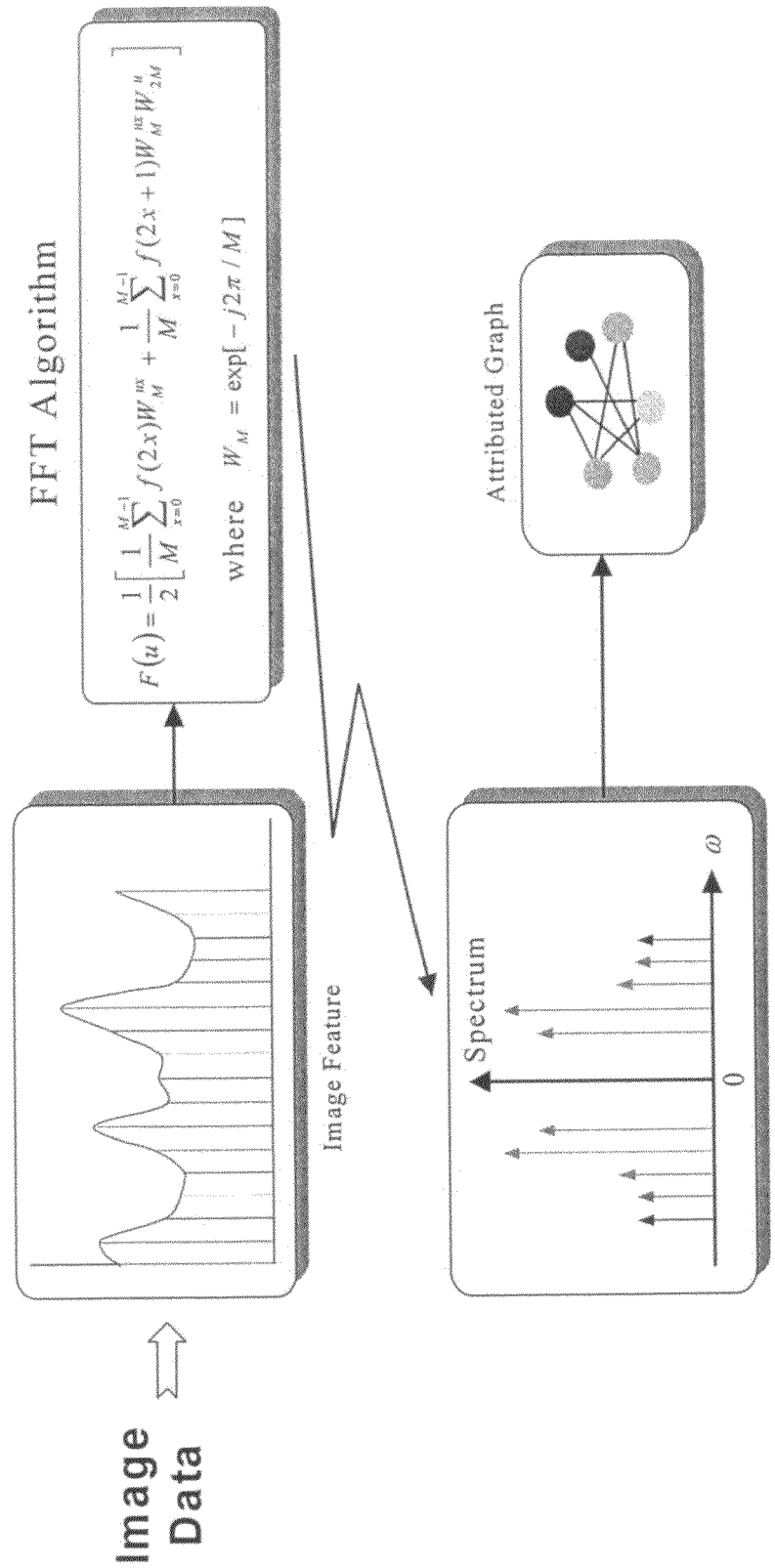
FIG. 21 illustrates the image feature extraction algorithm.

Additionally, feature matching-based range and orientation determination may also be performed. FIG. 21 gives the image feature extraction algorithm useful in this approach.

Attributed Graph Matching Algorithm

Figure 22:
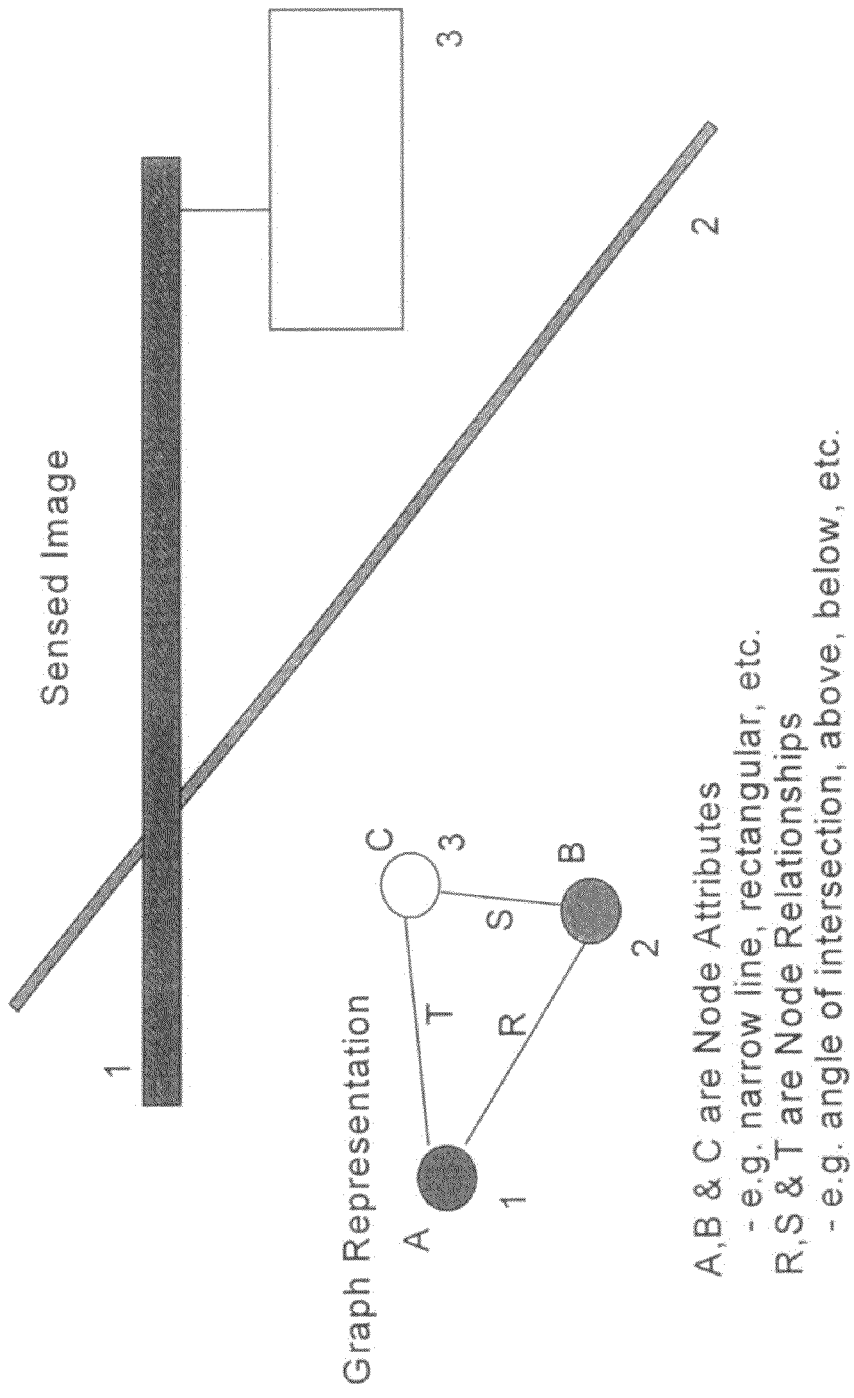
FIG. 22 illustrates an attributed graph representation derived form imagery obtained from the inspection process; the three detected objects or mage features 1, 2 and 3 are used to created or synthesize an attributed graph representation of the sensed scene; this sensed graph is then matched with store reference graphs.
Figure 23:
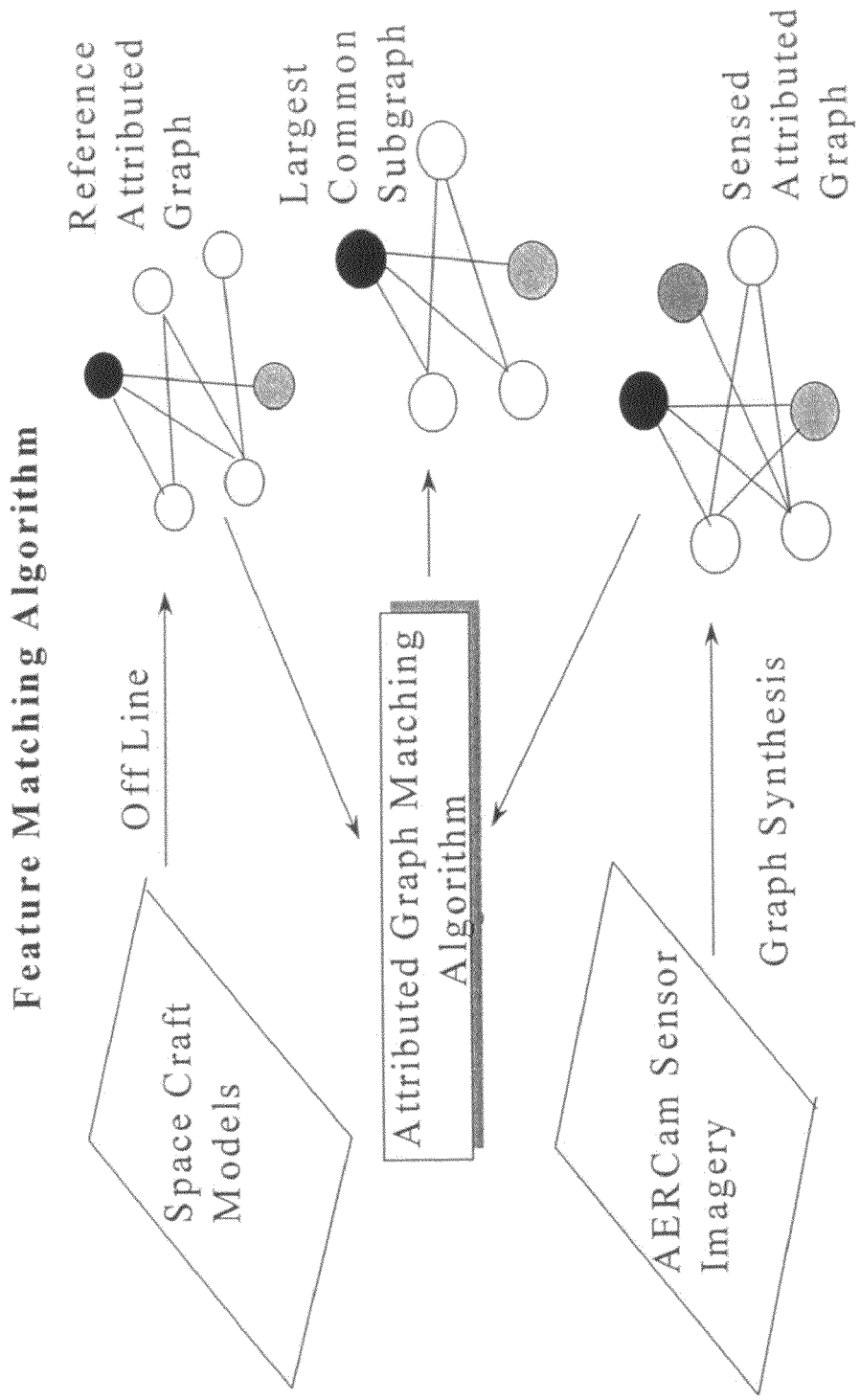
FIG. 23 illustrates attributed graph matching process; main spacecraft model are used to form reference graphs that are input to the matching process (offline); the live imagery derived from the stereo sensors is synthesize attributed graphs; finally, the two graph representations (reference and sensed) are matched using a specialized matching algorithm. The output is the largest common subgraph and represents the registration of the reference and sensed data.

One example of a sophisticated feature matching and scene registration technique that has been successfully applied to related applications is attributed graph matching. Attributed graphs are represented by nodes and arcs where each node corresponds to a derived image feature and arcs represent the relationships between nodes. For example, in FIG. 22, a sensed image consists of three objects (1,2,3) containing certain spatial relationships and attributes (size, thickness, texture). An attributed graph can be formed from these three detected features as shown in FIG. 23. The nodes of the graph correspond to the three individual detected features and the relations between nodes correspond to their angle of intersection or spatial relationships (above, to the right of, etc.). Nodes also contain attributes such as the size, thickness or texture associated with the detected image features.

Figure 24:
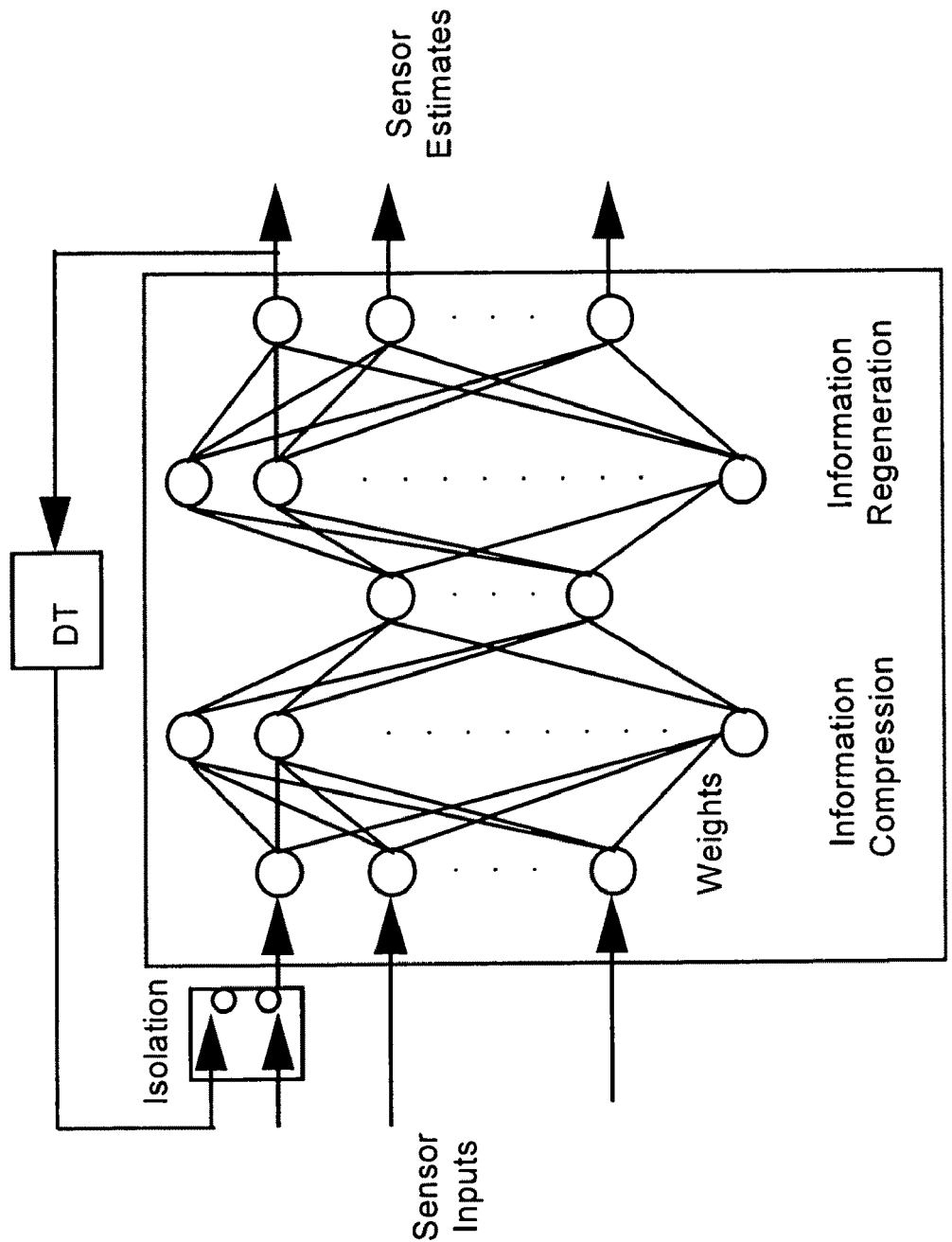
FIG. 24 illustrates an auto-associative neural network for sensor validation.

The basic matching process requires the creation of a reference attributed graph from available sources (example, information regarding the main spacecraft) and synthesizing a sensed attributed graph from the live sensor imagery. These comparable representations are then matched using a specialized search algorithm. The matching or graph registration procedure is shown in FIG. 24. The output of the attributed graph matching algorithm is the largest common subgraph which represents the degree of match between the reference and sensed data. The number of nodes and arcs in the output attributed graph can be used to assess the match quality, based on the number of nodes and arcs matched, and the uniqueness of their corresponding attributes. Moreover, the orientation, range (triangularization) and range rate (variation of matched features over time) of the robot relative to the main spacecraft can be estimated from the matched data.

The attributed graph matching algorithm shown in FIG. 24 uses a branch and bound technique to rapidly match the sensed and reference graphs. The process is mathematically a polynomial time algorithm. However, the attributes of the nodes and arcs in the graph collapse the search space and the registration can be easily performed in real time. The time consuming portion of the process is the feature extraction step where pixel data is processed to detect the objects in the sensed scene. Careful consideration should be given to the implementation of the feature extraction functions in hardware to satisfy throughput, thermal and volume constraints.

Intelligent Robust Multi-Sensor Failure Detection and Isolation

Basic Neural Network Architecture

For a redundant sensor set, it is possible to reconstruct one or more lost sensor data if the relationship among the sensors is known. Usually, the relationship can be described as mathematical equations with sensor measurements as variables. If an incorrect measurement occurs, there will be inconsistency among these equations.

An auto-associative neural network is a neural network that has a unit overall gain, which means that its output vector is set to match its input under normal operation. The proposed auto-associative neural network shown in FIG. 25 has four hidden layers for information compression and data regeneration. The redundant sensor information will be compressed, mixed and reorganized in the first part of the network (the first and second hidden layers). The compressed information represents the essential characteristics of the process with a smaller set of neurons. By a reason similar to that of majority voting, an input that contains faulty information will be discounted in the process. The compressed information is then used to regenerate the original data in the second part of the process (the third and fourth layers). It should be emphasized that the minimum number of the nodes in the threshold layer in the middle of the neural network represents the degrees of freedom (i.e. minimum number of sensor measurements required in order to regenerate all sensor estimates) of the redundant sensor group. In the data regeneration layer, the compressed information represented by the middle layer neurons is used to generate the original input data.

The objective of the auto-associative neural network training is to generate good sensor estimates for all sensors even though some of the sensor measurements have been corrupted. In order to make the neural network perform the desired mapping from the input layer to the output layer, one usually searches for the optimal connection weights between the neurons to approximate the desired mapping by training algorithms. The most popular training algorithm for feedforward networks with sigmoid activation functions is the back-propagation algorithm, which is used to adjust the weights of the network so that the network output will return the desired sensor measurements for both normal data sets and corrupted sensor sets. One of the most important objectives in the neural network training is to isolate a sensor estimate from its corresponding input. In other words, a failed sensor on the network input should not have any more impact on the corresponding network output than others. The failure isolation by the neural network is achieved by blocking out, during the training, the weights directly connected to the failed sensor in the network input.

As the backpropagation algorithm is a steepest descent method, it has the disadvantage of converging very slowly and being vulnerable to getting caught in local minima. To overcome these disadvantages, a so-called momentum term can be included to slide over small minima in the error surface, and the training time is shortened by the use of an adaptive learning rate.

The backpropagation with momentum is expressed mathematically:

$$\Delta w_{ij} = m_c \Delta w_{ij} + (1-m_c) lr \cdot d(i) p(j) \quad (0.1)$$

where $m_c$ is the momentum constant, lr is the adaptive learning rate.

Sensor Failure Detection and Replacement

The detection of a sensor failure is done by comparing the neural network outputs with its corresponding inputs. A threshold is selected for each sensor to initiate the sensor failure algorithm. If the differences of the other sensors with their respective estimates stay relatively low, then the sensor measurement is declared faulty.

Once a faulty sensor measurement is detected, it will be disconnected from the input layer of the network for the purposes of isolating the false information. However, the neural network will continue to function by using the most recent corresponding output which is a good estimate of the failed sensor measurement. Also, if the sensor measurement is used in the navigation fusion algorithm, the navigation system will switch to the estimated value to continue the system operation. Under this scheme, the system can remain operable even with multiple sensor failures.

Training of Neural Network and Simulation Evaluation

In order to ensure proper training of the neural network and to achieve the necessary accuracy required by the fusion algorithm, the following steps are taken:

Training data are generated by applying a 6DOF trajectory data.

The data generated are carefully screened to select a uniform data set across the range of interest, and Repeated training of the neural network by randomly selecting a data set, randomly failing a sensor reading, and using the back-propagation to adjust the weights, forces the outputs of the network to closely match the desired inputs.

For carrying out the training of neural networks and the closed-loop simulation evaluation, the following work shall be performed:

Selection of the number of hidden layers of the autoassociative neural network.

Generation of training data.

Off-line network training.

On-line simulation evaluation.

Trajectory Generation for the AERCam 1'

The trajectory data of the AERCam 1' will service the follow-on research activities, such as multi-sensor simulation, navigation algorithm evaluation, collision avoidance guidance algorithm development and evaluation, as well as hardware-in-the-loop (HIL) simulation and test for the AERCam 1''s autonomous multi-sensor based relative navigation and collision avoidance system.

Clohessy-Wiltshire (CW) Equations

If we just release the AERCam 1' from the ISS 2' it will move freely. It will change orbit so that if we put the AERCam 1' at one end of the ISS 2', after 45 minutes, it will be at the other end. To effect the dynamics of the AERCam 1' we must have the equations of motion of the AERCam 1' within the proximity of the ISS 2' with velocity and in coordinates originating from the ISS 2'. A right-handed (x,y,z) system was chosen with y in the direction of the radius from the earth's center to the mass center of the ISS 2' and with z in the direction of the rotation vector for the ISS 2', i.e. perpendicular to the plane of the ISS 2' orbit and in the direction of its angular momentum. The x axis lies along the tangent to the ISS 2' orbit and positive x is in the direction counter to the ISS 2''s direction of motion.

The equations of motion of the AERCam 1' are given, in this coordinate system, by:

$$\frac{F_x}{m} = \ddot{x} - 2w\dot{y} - w^2 x \quad (0.1)$$

$$\frac{F_y}{m} = \ddot{y} + 2w\dot{x} - w^2(y+r_0)$$

$$\frac{F_z}{m} = \ddot{z}$$

The $F_x$, $F_y$, and $F_z$ contain gravitational forces and perhaps thrust. By introducing the gravitational forces and expanding the gravitational terms in powers of $\sqrt{x^2+y^2+z^2}/r_0$, and denoting the thrust vector as $[T_x, T_y, T_z]^T$, the equations now become $$\frac{T_x}{m} = \ddot{x} - 2w\dot{y} \quad (0.2)$$

$$\frac{T_y}{m} = \ddot{y} + 2w\dot{x} - 3w^2 y$$

$$\frac{F_z}{m} = \ddot{z} + w^2 z$$

Under the assumption of $T_x = T_y = T_z = 0$, the solution is given by $$x = 2\left(\frac{2\dot{x}_0}{w} - 3y_0\right)\sin wt - \frac{2\dot{y}_0}{w}\cos wt + (6wy_0 - 3\dot{x}_0)t + \left(x_0 + \frac{2\dot{y}_0}{w}\right) \quad (0.3)$$

$$y = \left(\frac{2\dot{x}_0}{w} - 3y_0\right)\cos wt + \frac{\dot{y}_0}{w}\sin wt + \left(4y_0 - \frac{2\dot{x}_0}{w}\right)$$

$$z = z_0 \cos wt + \frac{\dot{z}_0}{w}\sin wt$$

where $x_0$, $y_0$, $z_0$, $\dot{x}_0$, $\dot{y}_0$, $\dot{z}_0$ are initial values of position and velocity of the AERCam 1'. Equation z shows that the AERCam 1' performs simple harmonic motion in the z direction.

AERCam 1' Trajectory Generation Scheme

According to this invention's requirements we do not need an absolute AERCam 1' trajectory for navigation algorithm development and validation. There is a need for a precision relative trajectory with respect to the International Space Station (ISS 2') for navigation algorithm development. Therefore a trajectory of the AERCam 1' was generated as a small purturbation of the ISS 2' trajectory for this invention. The sophisticated trajectory generation can use Clohessy-Wiltshire (CW) formulation to include the AERCam 1''s dynamics. The ISS 2' trajectory may be obtained from the orbital ISS 2' model and measurements, and the AERCam 1' dynamic model may be derived using a technique similar to that shown below for the ISS 2'.

The AERCam 1' is a small free-flying unmanned platform capable of teleoperation and autonomous flight in close proximity to the ISS 2'. It will be able to hold position (station keeping) relative to, or to fly trajectories about its target. The trajectory of the AERCam 1' in the Earth-Centered-Earth-Fixed (ECEF) coordinate system is related to the trajectory of the ISS 2'. In addition, the relative trajectory of the AERCam 1' with respect to the ISS 2' is a low-dynamics process with low-speed motion and slow change in relative position. Based on these considerations, we figured out the AERCam 1' trajectory generation scheme as follows:

Step 1: Generate a standard six-degree-of-freedom (6-DOF) trajectory in ECEF coordinate system for the ISS 2';

Step 2: Generate a relative trajectory with respect to the ISS 2' for the AERCam 1';

Setp 3: Merge the ISS 2' trajectory in the ECEF system and the AERCam 1''s relative trajectory to obtain a trajectory of the AERCam 1' in the ECEF system. The trajectory data in the ECEF coordinate system can be easily transformed into that in the ECI (Earth Centered Inertial) coordinate system to meet the HIL simulation requirements.

The AERCam 1''s relative trajectory can be used for evaluating the relative navigation solution and developing the collision avoidance algorithm. The AERCam 1''s trajectory in the inertial system can be used for navigation sensor validation and simulation, including the GPS receiver and the IMU.

Since the current objective is to develop a reasonable truth reference trajectory for the AERCam 1' navigation system eveluation, we neglect the orbital effects of the relative ISS 2'-AERCam 1' motion for now. We assume sufficient AERCam 1' fuel supply to maintain its desired station with respect to the ISS 2'.

Step 1: Formulation of the ISS 2' Trajectory Generation

The force equation of motion of the ISS 2' in body axes $F_B$ is $$\vec{f}_B = m\vec{a}_{C_B} \quad (0.4)$$

where, $\vec{a}_{C_B}$ is given by $$\vec{a}_{C_B} = \dot{\vec{V}}^E_B + (\vec{\omega}_B + \vec{\omega}^E_B) \times \vec{V}^E_B \quad (0.5)$$

The scalar components of the vectors of the above equation are $$\vec{V}^E_B = \begin{bmatrix} u \\ v \\ w \end{bmatrix} \quad (0.6)$$

$$\vec{\omega}_B = \begin{bmatrix} p \\ q \\ r \end{bmatrix} \quad (0.7)$$

The Earth's rotation expressed in ISS 2' body axes is $$\vec{\omega}^E_B = \begin{bmatrix} p^E_B \\ q^E_B \\ r^E_B \end{bmatrix} = L_{BV} \begin{bmatrix} \cos\lambda \\ 0 \\ -\sin\lambda \end{bmatrix} \omega^E \quad (0.8)$$

$\vec{a}_{C_B}$ is expanded to give $$a_{C_x} = \dot{u} + (q+q^E_B)w - (r+r^E_B)v$$

$$a_{C_y} = \dot{v} + (r+r^E_B)u - (p+p^E_B)w$$

$$a_{C_z} = \dot{w} + (p+p^E_B)v - (q+q^E_B)u \quad (0.9)$$

With the jet thruster force in body axes denoted by $$T_B = \begin{bmatrix} X \\ Y \\ Z \end{bmatrix} \quad (0.10)$$

in accordance with traditional usage, and treating gravity in the ISS 2' body axes as $$\vec{g}_B = L_{BV}\vec{g}_v \quad (0.11)$$

$$= \begin{bmatrix} \cos\theta\cos\psi & \cos\theta\sin\psi & -\sin\theta \\ \sin\phi\sin\theta\cos\psi - \cos\phi\sin\psi & \sin\phi\sin\theta\sin\psi + \cos\phi\cos\psi & \sin\phi\cos\theta \\ \cos\phi\sin\theta\cos\psi + \sin\phi\sin\psi & \cos\phi\sin\theta\sin\psi - \sin\phi\cos\psi & \cos\phi\cos\theta \end{bmatrix} \begin{bmatrix} 0 \\ 0 \\ g \end{bmatrix}$$

the force equation (9.4) becomes:

$$X - mg\sin\theta = m[\dot{u} + (q+q^E_B)w - (r+r^E_B)v]$$

$$Y + mg\cos\theta\sin\phi = m[\dot{v} + (r+r^E_B)u - (p+p^E_B)w]$$

$$Z + mg\cos\theta\cos\phi = m[\dot{w} + (p+p^E_B)v - (q+q^E_B)u] \quad (0.12)$$

Correspondingly, the moment equation due to jet thruster in body axes is $$\vec{G}_B = L_{BI}\vec{G}_I = \dot{\vec{h}}_B + \vec{\omega}_B \times \vec{h}_B \quad (0.13)$$

The conventional notation for $\vec{G}_B$ (jet thruster moments) and $\vec{h}_B$ (angular moments) is $$\vec{G}_B = \begin{bmatrix} L \\ M \\ N \end{bmatrix} \quad (0.14)$$

$$\vec{h}_B = \begin{bmatrix} h_x \\ h_y \\ h_z \end{bmatrix}$$

The resulting ISS 2' moment equation in body axes is $$L = I_x \dot{p} - I_{yz}(q^2 - r^2) - I_{zx}(\dot{r} + pq) - I_{xy}(\dot{q} - rp) - (I_y - I_z)qr$$

$$M = I_y \dot{q} - I_{zx}(r^2 - p^2) - I_{xy}(\dot{p} + qr) - I_{yz}(\dot{r} - pq) - (I_z - I_x)rp$$

$$N = I_z \dot{r} - I_{xy}(p^2 - q^2) - I_{yz}(\dot{q} + rp) - I_{zx}(\dot{p} - qr) - (I_x - I_y)pq \qquad (0.15)$$

Based on the force equation (9.12) and the moment equation (9.15), the ISS 2''s six-degree-of-freedom trajectory data was generated.

Step 2: Relative Trajectory Generation for the AERCam 1'

Figure 25:
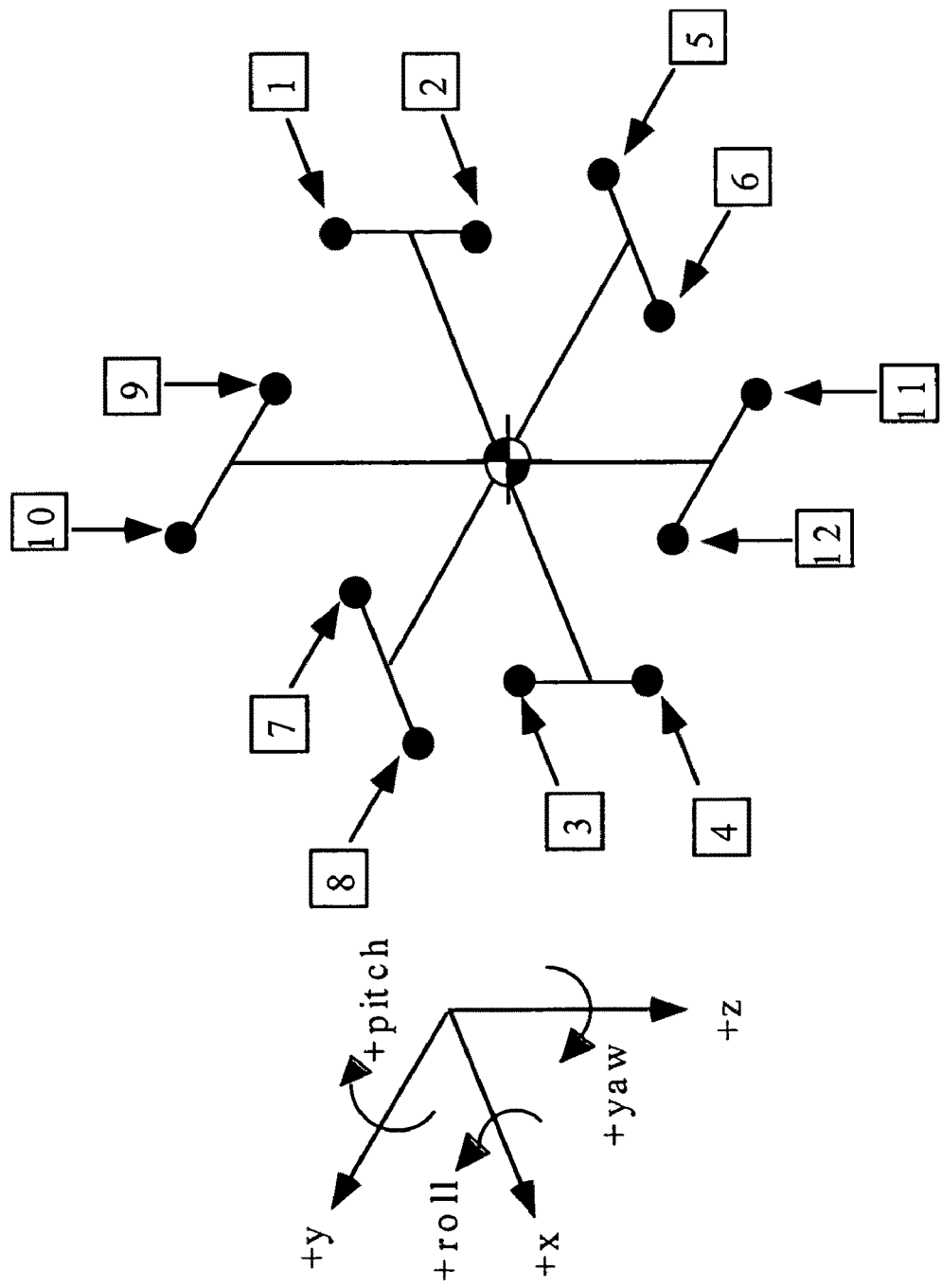
FIG. 25 illustrates the AERCam 1' jet model.

We have to consider the AERCam 1''s dynamic model when executing efforts to generate the trajectory for the AERCam 1'. FIG. 25 shows the features of the AERCam 1' II. FIG. 9-2 provides the AERCam 1''s thruster jet model.

The minimum thruster duty cycle is 0.004 seconds, and the jet force is 0.085 lbf. The jet locations (x,y,z) [meters] are:
jet1=[−0.1143; 0.0000; −0.1016];
jet2=[−0.1143; 0.0000; 0.1016];
jet3=[0.1143; 0.0000; −0.1016];
jet4=[0.1143; 0.0000; 0.1016];
jet5=[−0.1016; −0.1143; 0.0000];
jet6=[0.1016; −0.1143; 0.0000];
jet7=[−0.1016; 0.1143; 0.0000];
jet8=[0.1016; 0.1143; 0.0000];
jet9=[0.0000; −0.1016; −0.1143];
jet10=[0.0000; 0.1016; −0.1143];
jet11=[0.0000; −0.1016; 0.1143];
jet12=[0.0000; 0.1016; 0.1143];

The jet thrust direction unit vectors are:
jet1=[1.0000; 0.0000; 0.0000];
jet2=[1.0000; 0.0000; 0.0000];
jet3=[−1.0000; 0.0000; 0.0000];
jet4=[−1.0000; 0.0000; 0.0000];
jet5=[0.0000; 1.0000; 0.0000];
jet6=[0.0000; 1.0000; 0.0000];
jet7=[0.0000; −1.0000; 0.0000];
jet8=[0.0000; −1.0000; 0.0000];
jet9=[0.0000; 0.0000; 1.0000];
jet10=[0.0000; 0.0000; 1.0000];
jet11=[0.0000; 0.0000; −1.0000];
jet12=[0.0000; 0.0000; −1.0000];

The AERCam 1' CG offset (x,y,z) [inches] is [0.332, 0.224, 0.165]. The inertia matrix [lbm in^2] is
I=[539.1, −14.7, 13.6;
−14.7, 570.7, 21.9;
13.6, 21.9, 531.4]

Figure 26:
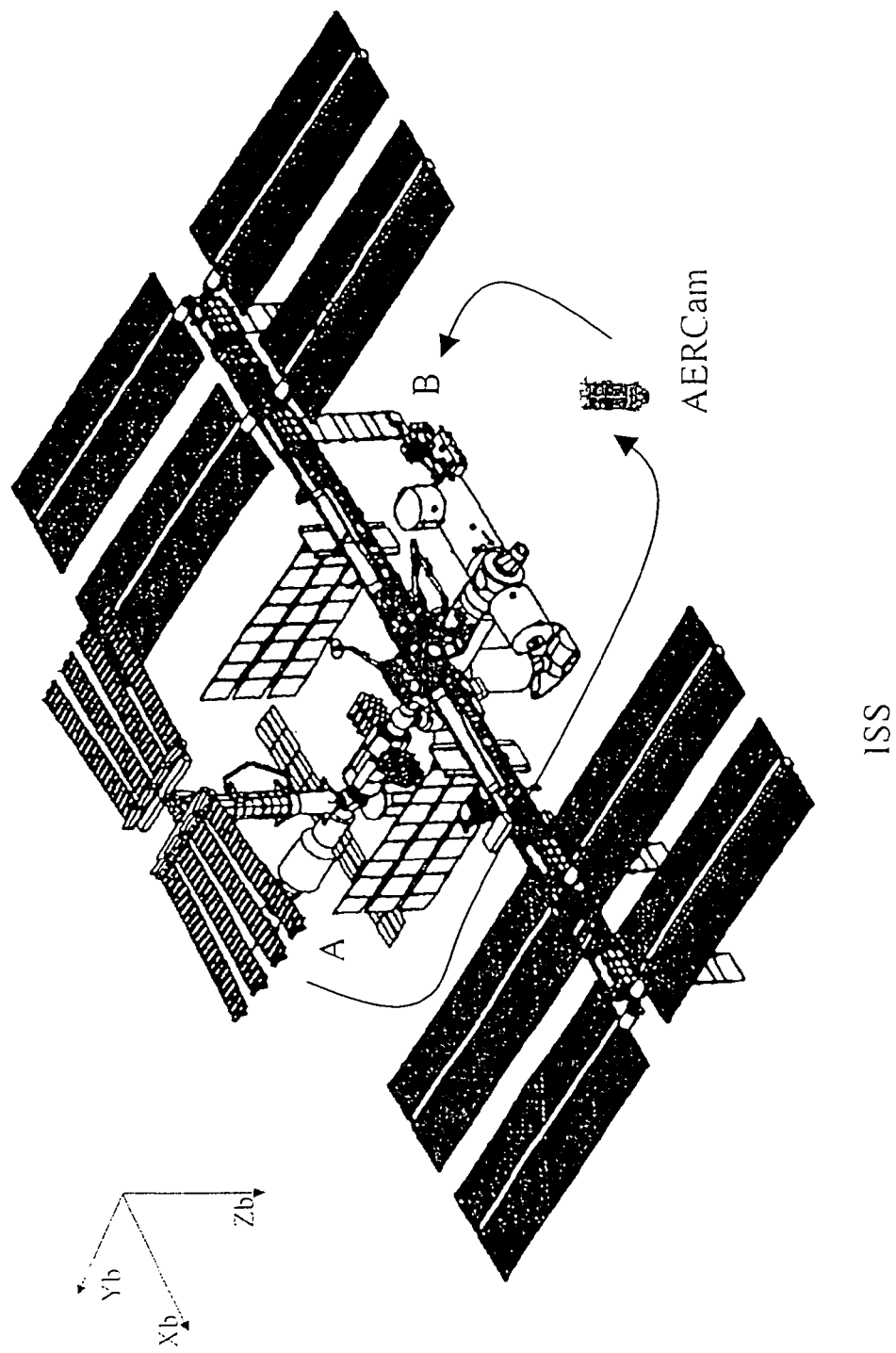
FIG. 26 illustrates the AERCam 1' flying a trajectory from point A to point B.

Consequently, FIG. 26 is a sample relative trajectory of the AERCam 1' with respect to the ISS 2'.

The coordinate system used for relative trajectory generation is the ISS 2' body axes, which are defined as:

Origin is at the ISS 2''s center of mass (COM).

Xb-axis points along the ISS 2''s longitudinal (fuselage) axis (called the roll axis).

Yb axis points out to the right side of the ISS 2' (called the pitch axis).

Zb axis points down.

Figure 27:
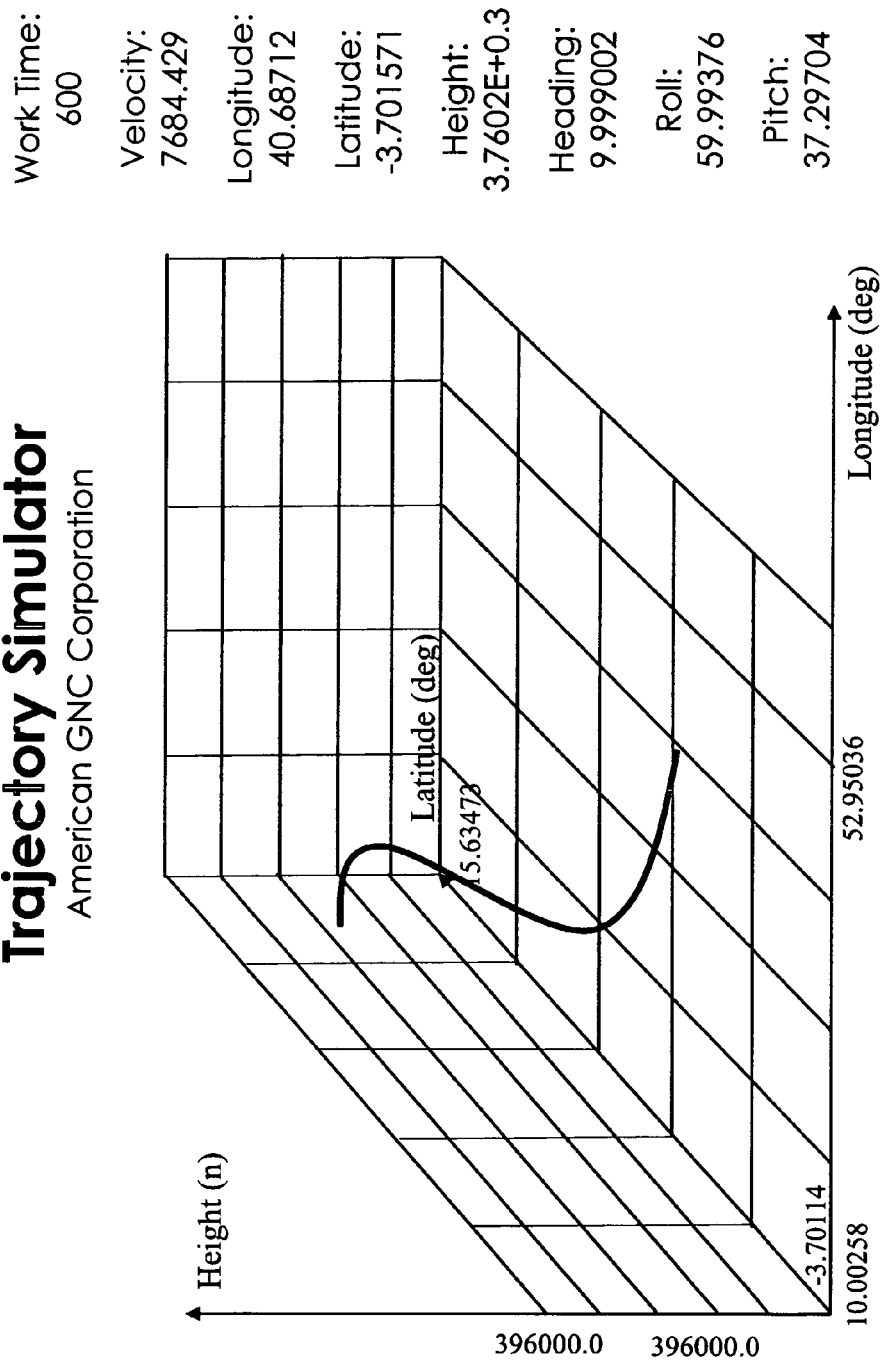
FIG. 27 illustrates the AERCam 1' trajectory in ECEE coordinate system.

The corresponding trajectory in the ECEF coordinate system of the AERCam 1' is given in FIG. 27. Table 4 gives the trajectory parameters.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of three dimensional positioning of objects, comprising the steps of:
    (a) injecting raw measurements from two or more sensors into a data fusion system to derive relative position and attitude information of objects;
    (b) tracking at least four common GPS (Global Positioning System) satellites simultaneously by means of AERCam (autonomous Extravehicular Activity Robotic Camera) 1' and ISS (International Space Station) 2';
    (c) optimally blending multipath signal and GPS signal due to any intermittently fail of relative GPS-alone when said AERCam 1' maneuvers into a proximity of said ISS 2' because of occasional strong multipath signal and GPS signal blockage with IMU data including gyro and accelerometer measurements;
    (d) initializing an inertial navigation system when a GPS solution is available and using said GPS solution;
    (e) tracking position and attitude of said AERCam 1' relative to said ISS 2' by said inertial navigation system in close proximity;
    (f) estimating and resetting frequently for errors of said inertial navigation system growing with time;
    (g) aiding said inertial navigation system during close proximity operation with available GPS signals and at least two cameras installed on said AERCam 1' to maintain accurate relative navigation, wherein range and range rate between said AERCam 1' and said ISS 2' are blended in multi-sensor fusion algorithm to compensate for IMU sensor drifts during GPS outage or unreliable GPS data; and
    (h) imaging said ISS 2' by at least two cameras installed on said AERCam 1' for images which are further processed via correlation and coordinate transformations techniques to derive range and range rate on-board of said ACRCam 1' for image parameters which are able to be computed and transmitted said range and range rate back to said AERCam 1'.

2. The method, as recited in claim 1, wherein, in the step (c), three accelerometers and three gyros are used in a multi-sensor based navigation system to provide three-dimensional position and attitude solutions.

3. The method, as recited in claim 1, further comprising a step of performing intelligent failure detection and isolation for multiple disparate navigation sensors by using one or more neural networks and generate filtered sensor estimates for said sensors even though some of the sensor measurements have been corrupted by noise, disturbances or failures.

4. The method, as recited in claim 3, wherein said neural network has four hidden layers for information compression and data regeneration and is trained to generate said filtered sensor estimates.

5. The method, as recited in claim 4, further comprising a step of determining continuously coordinates with respect to an unknown point by means of a MEMS coremicro IMU supporting said AERCam 1'.

6. The method, as recited in claim 5, further comprising a step of obtaining accurate positioning with said GPS by using of carrier phase observables.

7. The method, as recited in claim 6, further comprising a step of mitigating a potential impact on accuracy of said MEMS coremicro IMU via smart integration algorithms with navigation sensors, including rate sensors and accelerometers, wherein sources of said rate sensors and accelerometers have been sought out and characteristics of said rate sensors and accelerometers are obtained so that models of said MEMS coremicro IMU are able to be generated for simulations of said AERCam 1', including sensor biases, drift rates, response times, and noise sources.

8. The method, as recited in claim 1, further comprising a step of aiding acquisition and tracking of GPS signals by said inertial navigation system to extend dynamics thereof while maintaining a minimum tracking loop bandwidth.

9. The method, as recited in claim 8, further comprising a step of providing mechanics of using GPS solution to aid said inertial navigation system and using inertial navigation system solution thereof to aid code and carrier tracking of a GPS receiver.

10. The method, as recited in claim 9, wherein said GPS receiver provides raw pseudorange and carrier phase observables for an integrated navigation Kalman filter and a synchronous timing signal for date sampling electronics of said MEMS coremicro IMU, wherein IMU instrument errors are corrected in said integrated navigation Kalman filter and said IMU electronics.

11. The method, as recited in claim 10, wherein said GPS receiver accomplishing identification of all visible satellites with calculation of geometric dilution of precision, measurement of satellite-to-receiver pseudoranges and decoding of navigation messages, delivery of data to a navigation microprocessor, and receiving of velocity and acceleration aiding data from said integrated navigation Kalman filter to perform external aiding, carrier phase and code tracking.

12. The method, as recited in claim 11, wherein an absolute AERCam 1' trajectory is not needed for navigation algorithm development and validation while a precision relative trajectory with respect to said ISS 2' for navigation algorithm development is needed, wherein said trajectory of said AERCam 1' is generated as a small perturbation of said ISS 2' trajectory.

13. The method, as recited in claim 12, wherein a sophisticated trajectory generation is able to use Chohessy-Wiltshire formulation to include dynamics of said AERCam 1', said trajectory of said ISS 2' is able to be obtained from orbital ISS 2' model and measurements.

14. The method, as recited in claim 13, wherein said AERCam 1' is a small free-flying unmanned platform capable of teleoperation and autonomous flight in close proximity to said ISS 2', which is able to hold position relative to fly trajectories about a target thereof, wherein said trajectory of said AERCam 1' in an Earth-Centered-Earth-Fixed (ECEF) coordinate system is related to said trajectory of said ISS 2', wherein a relative trajectory of said AERCam 1' with respect to said ISS 2' is a low-dynamics process with low-speed motion and slow change in relative position.

15. The method, as recited in claim 14, further comprising the steps of:
generating a standard six-degree-of-freedom (6-DOF) trajectory in said ECEF coordinate system for said ISS 2';
generating said relative trajectory with respect to said ISS 2' for said AERCam 1'; and
merging said trajectory of said ISS 2' in said ECEF coordinate system and said relative trajectory of said AERCam 1' to obtain said trajectory of said AERCam 1' in said ECEF coordinate system.

16. The method, as recited in claim 15, further comprising a step of transforming trajectory data in said ECEF coordinate system into an Earth Centered Inertial coordinate system to meet HIL simulation requirements.

17. The method, as recited in claim 15, wherein said relative trajectory of said AERCam 1' is used for evaluation relative navigation solution and developing collision avoidance algorithm and said trajectory of said AERCam 1' in said inertial navigation system is used for navigation sensor validation and simulation, including said GPS receiver and said MEMS coremicro IMU.

* * * * *